(12) United States Patent
Kagawa et al.

(10) Patent No.: US 10,969,704 B2
(45) Date of Patent: Apr. 6, 2021

(54) MAGNETIC TONER AND METHOD FOR MANUFACTURING MAGNETIC TONER

(71) Applicant: CANON KABUSHIKI KAISHA, Tokyo (JP)

(72) Inventors: Hiroki Kagawa, Mishima (JP); Shuntaro Watanabe, Hadano (JP); Hiroki Akiyama, Suntou-gun (JP); Tatsuya Saeki, Suntou-gun (JP); Takashi Matsui, Mishima (JP)

(73) Assignee: CANON KABUSHIKI KAISHA, Toyko (JP)

(*) Notice: Subject to any disclaimer, the term of this patent is extended or adjusted under 35 U.S.C. 154(b) by 0 days.

(21) Appl. No.: 16/438,611

(22) Filed: Jun. 12, 2019

(65) Prior Publication Data
US 2019/0384192 A1 Dec. 19, 2019

(30) Foreign Application Priority Data

Jun. 13, 2018 (JP) .............................. JP2018-113107
Apr. 10, 2019 (JP) .............................. JP2019-074994

(51) Int. Cl.
G03G 9/087 (2006.01)
G03G 9/083 (2006.01)
C08F 212/10 (2006.01)
C08F 220/46 (2006.01)
C08F 220/68 (2006.01)
G03G 9/08 (2006.01)
G03G 9/107 (2006.01)
G03G 9/113 (2006.01)

(52) U.S. Cl.
CPC ......... *G03G 9/0837* (2013.01); *C08F 212/10* (2013.01); *C08F 220/46* (2013.01); *C08F 220/68* (2013.01); *G03G 9/081* (2013.01); *G03G 9/08711* (2013.01); *G03G 9/08731* (2013.01); *G03G 9/1075* (2013.01); *G03G 9/1135* (2013.01)

(58) Field of Classification Search
CPC ........... G03G 9/08724; G03G 9/08702; G03G 9/08728
See application file for complete search history.

(56) References Cited

U.S. PATENT DOCUMENTS

| | | | |
|---|---|---|---|
| 6,579,653 B1* | 6/2003 | Yuasa | G03G 9/081 430/108.2 |
| 7,014,969 B2 | 3/2006 | Yachi et al. | |
| 7,678,523 B2 | 3/2010 | Hiroko et al. | |
| 7,842,446 B2 | 11/2010 | Yanase et al. | |
| 7,923,190 B2 | 4/2011 | Magome et al. | |
| 7,935,467 B2 | 5/2011 | Dojo et al. | |
| 8,426,091 B2 | 4/2013 | Magome et al. | |
| 8,426,094 B2 | 4/2013 | Magome et al. | |
| 8,603,712 B2 | 12/2013 | Aoki et al. | |
| 8,614,044 B2 | 12/2013 | Matsui et al. | |
| 8,741,519 B2 | 6/2014 | Watanabe et al. | |
| 8,778,585 B2 | 7/2014 | Matsui et al. | |
| 8,785,101 B2 | 7/2014 | Kaya et al. | |
| 8,841,054 B2 | 9/2014 | Dojo et al. | |
| 8,846,284 B2 | 9/2014 | Kinumatsu et al. | |
| 8,883,389 B2 | 11/2014 | Matsui et al. | |
| 9,097,997 B2 | 8/2015 | Nomura et al. | |
| 9,201,323 B2 | 12/2015 | Nishikawa et al. | |
| 9,213,250 B2 | 12/2015 | Nomura et al. | |
| 9,217,943 B2 | 12/2015 | Matsui et al. | |
| 9,239,528 B2 | 1/2016 | Hasegawa et al. | |
| 9,250,548 B2 | 2/2016 | Nomura et al. | |
| 9,261,804 B2 | 2/2016 | Yamazaki et al. | |
| 9,304,422 B2 | 4/2016 | Matsui et al. | |
| 9,309,349 B2 | 4/2016 | Watanabe et al. | |
| 9,341,970 B2 | 5/2016 | Yoshiba et al. | |
| 9,348,246 B2 | 5/2016 | Magome et al. | |
| 9,354,545 B2 | 5/2016 | Matsui et al. | |

(Continued)

FOREIGN PATENT DOCUMENTS

| | | |
|---|---|---|
| EP | 0 703 505 | 3/1996 |
| EP | 0 744 668 | 11/1996 |

(Continued)

OTHER PUBLICATIONS

U.S. Appl. No. 16/259,159, Shuntaro Watanabe, filed Jan. 28, 2019.
U.S. Appl. No. 16/272,254, Shuntaro Watanabe, Feb. 11, 2019.
Fedors, "A Method for Estimating Both the Solubility Parameters and Molar Volumes of Liquids", Polymer Engineering and Science, vol. 14, No. 2 (1974) 147-54.
U.S. Appl. No. 16/438,537, Kentaro Kamae, filed Jun. 12, 2019.
U.S. Appl. No. 16/438,541, Takeshi Hashimoto, filed Jun. 12, 2019.
U.S. Appl. No. 16/438,544, Kazuhisa Shirayama, filed Jun. 12, 2019.

(Continued)

*Primary Examiner* — Peter L Vajda
(74) *Attorney, Agent, or Firm* — Venable LLP

(57) ABSTRACT

Provided is a magnetic toner having a toner particle containing a binder resin and a magnetic body, wherein the binder resin contains a polymer A having a first monomer unit and a second monomer unit, the first polymerizable monomer is at least one selected from the group consisting of the (meth)acrylic acid esters having $C_{18-36}$ alkyl groups, a content of the first monomer unit and a content of the second monomer unit based on the total moles of all monomer units in the polymer A are respectively 5.0 to 60.0 mol % and 20.0 to 95.0 mol %, and assuming that an SP value of the first monomer unit and the second monomer unit are taken as $SP_{11}$ $(J/cm^3)^{0.5}$ and $SP_{21}$ $(J/cm^3)^{0.5}$, respectively, $3.00 \leq (SP_{21} - SP_{11}) \leq 25.00$ is satisfied, and an oil absorption of the magnetic body is 5 to 40 ml/100 g.

19 Claims, No Drawings

(56) References Cited

U.S. PATENT DOCUMENTS

| | | | |
|---|---|---|---|
| 9,429,860 B2 | 8/2016 | Kinumatsu et al. | |
| 9,442,416 B2 | 9/2016 | Magome et al. | |
| 9,442,419 B2 | 9/2016 | Wakabayashi et al. | |
| 9,470,993 B2 | 10/2016 | Nishikawa et al. | |
| 9,581,934 B2 | 2/2017 | Ito et al. | |
| 9,606,462 B2 | 3/2017 | Nomura et al. | |
| 9,658,546 B2 | 5/2017 | Tanaka et al. | |
| 9,658,554 B2 | 5/2017 | Kinumatsu et al. | |
| 9,798,256 B2 | 10/2017 | Kosaki et al. | |
| 9,798,262 B2 | 10/2017 | Toyoizumi et al. | |
| 9,811,016 B2 | 11/2017 | Aoki et al. | |
| 9,823,595 B2 | 11/2017 | Toyoizumi et al. | |
| 9,829,818 B2 | 11/2017 | Yoshiba et al. | |
| 9,857,707 B2 | 1/2018 | Tsuda et al. | |
| 9,857,713 B2 | 1/2018 | Kosaki et al. | |
| 9,869,943 B2 | 1/2018 | Aoki et al. | |
| 9,904,195 B2 | 2/2018 | Matsui et al. | |
| 10,012,919 B2 | 7/2018 | Matsui et al. | |
| 10,101,683 B2 | 10/2018 | Nishikawa et al. | |
| 10,156,800 B2 | 12/2018 | Tsuda et al. | |
| 10,197,934 B2 | 2/2019 | Matsui et al. | |
| 10,241,430 B2 | 3/2019 | Kimura et al. | |
| 10,289,016 B2 | 5/2019 | Fukudome et al. | |
| 10,295,921 B2 | 5/2019 | Ohmori et al. | |
| 2002/0086229 A1* | 7/2002 | Yuasa | G03G 9/08795 430/108.4 |
| 2004/0185367 A1 | 9/2004 | Serizawa et al. | |
| 2007/0166636 A1 | 7/2007 | Daimon et al. | |
| 2009/0087768 A1 | 4/2009 | Tosaka et al. | |
| 2009/0197192 A1 | 8/2009 | Hiroko et al. | |
| 2010/0035171 A1 | 2/2010 | Watanabe et al. | |
| 2011/0045398 A1* | 2/2011 | Sekikawa | G03G 9/0926 430/108.22 |
| 2014/0038098 A1 | 2/2014 | Naka et al. | |
| 2014/0272699 A1* | 9/2014 | Minaki | G03G 9/08764 430/109.3 |
| 2014/0308611 A1 | 10/2014 | Shimano et al. | |
| 2015/0185658 A1 | 7/2015 | Wakabayashi et al. | |
| 2016/0139522 A1 | 5/2016 | Yoshiba et al. | |
| 2016/0161874 A1 | 6/2016 | Yamazaki et al. | |
| 2017/0045834 A1 | 2/2017 | Shirai et al. | |
| 2017/0199475 A1* | 7/2017 | Fukudome | G03G 9/08784 |
| 2017/0269496 A1 | 9/2017 | Kubo et al. | |
| 2018/0081288 A1* | 3/2018 | Sugama | G03G 9/08797 |
| 2018/0143557 A1 | 5/2018 | Ueda et al. | |
| 2018/0231901 A1 | 8/2018 | Koji et al. | |

FOREIGN PATENT DOCUMENTS

| | | | |
|---|---|---|---|
| EP | 1 494 087 | 1/2005 | |
| EP | 2256174 | * 12/2010 | C09J 133/04 |
| EP | 2 626 745 | 8/2013 | |
| EP | 2626745 | * 8/2013 | G03G 9/0806 |
| EP | 2 843 473 | 3/2015 | |
| JP | 2000-250264 | 9/2000 | |
| JP | 2011-094137 | 5/2011 | |
| JP | 2013-228724 | 11/2013 | |
| JP | 2014-222259 | 11/2014 | |
| JP | 2016-053654 | 4/2016 | |
| JP | 2017-223895 | 12/2017 | |

OTHER PUBLICATIONS

U.S. Appl. No. 16/438,545, Kenta Kamikura, filed Jun. 12, 2019.
U.S. Appl. No. 16/438,553, Kenji Aoki, filed Jun. 12, 2019.
U.S. Appl. No. 16/438,566, Takashi Matsui, filed Jun. 12, 2019.
U.S. Appl. No. 16/438,605, Daisuke Yoshiba, filed Jun. 12, 2019.
U.S. Appl. No. 16/438,623, Tatsuya Saeki, filed Jun. 12, 2019.

* cited by examiner

MAGNETIC TONER AND METHOD FOR MANUFACTURING MAGNETIC TONER

BACKGROUND OF THE INVENTION

Field of the Invention

The present invention relates to a magnetic toner (hereunder sometimes called simply "the toner") for use in electrophotographic methods, electrostatic recording methods, magnetic recording methods and the like, and to a method for manufacturing the magnetic toner.

Description of the Related Art

In image-forming apparatuses using electrophotographic systems, there has been increasing demand for energy savings in recent years, and toners with excellent low-temperature fixability are needed to reduce the amount of heat used for fixing.

The need for good image quality also remains high. One method for improving low-temperature fixability is to include a crystalline resin in the toner. Crystalline resins plasticize at the melting point, rapidly compatibilizing with the binder resin and promoting melt deformation of the toner.

Thus, low-temperature fixability can be greatly improved by including a large amount of a crystalline resin. However, crystalline resins also have low electrical resistance, and a toner containing a large amount of a crystalline resin has poor charge retention and charging uniformity, detracting from developing performance.

The loss of developing performance is particularly evident with magnetic toners because magnetic bodies with low electrical resistance are a source of charge leaks. This has led to image problems such as "fogging", in which a toner with a small charge quantity is developed on a non-image area of the photosensitive member, and "tailing", in which the toner laid-on level is greater in the trailing ends of horizontal line images.

A high degree of crystallinity is also required to ensure heat-resistant storage stability in toners containing large amounts of crystalline resin.

Japanese Patent Application Laid-open No. 2017-223895 proposes a magnetic toner comprising a charge control agent carried on a crystalline polyester resin with the aim of improving low-temperature fixability, developing performance and heat-resistant storage stability.

With the same aim, Japanese Patent Application Laid-open No. 2016-53654 proposes a toner containing a crystalline polyester and an amorphous polyester having a highly hydrophobic rosin skeleton.

SUMMARY OF THE INVENTION

However, it has been found that with the toner for electrostatic latent image development described in Japanese Patent Application Laid-open No. 2017-223895, the charge control agent is not sufficient to ensure charging uniformity when a large amount of the crystalline polyester resin is added, and it is difficult to achieve both low-temperature fixability and developing performance.

Meanwhile, while the electrophotographic toner described in Japanese Patent Application Laid-open No. 2016-53654 has been somewhat effective at improving heat-resistant storage stability, it has been difficult to increase the electrical resistance of the toner, and the charging performance has been unsatisfactory.

In light of these problems, the present invention provides a magnetic toner satisfactory in all of low-temperature fixability, developing performance and heat-resistant storage stability, together with a method for manufacturing this magnetic toner.

The present invention relates to a magnetic toner, including:

a toner particle, the toner particle including a binder resin and a magnetic body, wherein the binder resin contains a polymer A having a first monomer unit derived from a first polymerizable monomer and a second monomer unit derived from a second polymerizable monomer different from the first polymerizable monomer, the first polymerizable monomer is at least one selected from the group consisting of (meth)acrylic acid esters each having a $C_{18-36}$ alkyl group, a content of the first monomer unit in the polymer A is 5.0 mol % to 60.0 mol % of the total moles of all monomer units in the polymer A, a content of the second monomer unit in the polymer A is 20.0 mol % to 95.0 mol % of the total moles of all monomer units in the polymer A, and assuming that an SP value of the first monomer unit is taken as $SP_{11}$ $(J/cm^3)^{0.5}$ and an SP value of the second monomer unit is taken as $SP_{21}$ $(J/cm^3)^{0.5}$, formula (1):

$$3.00 \le (SP_{21} - SP_{11}) \le 25.00 \tag{1}$$

is satisfied, and an oil absorption of the magnetic body is 5 ml/100 g to 40 ml/100 g.

The present invention also relates to a magnetic toner, including:

a toner particle, the toner particle including a binder resin and a magnetic body, wherein the binder resin contains a polymer A that is a polymer derived from a composition containing a first polymerizable monomer and a second polymerizable monomer that is different from the first polymerizable monomer, the first polymerizable monomer is at least one selected from the group consisting of (meth)acrylic acid esters each having a $C_{18-36}$ alkyl group, a content of the first polymerizable monomer in the composition is 5.0 mol % to 60.0 mol % of the total moles of all polymerizable monomers in the composition, a content of the second polymerizable monomer in the composition is 20.0 mol % to 95.0 mol % of the total moles of all polymerizable monomers in the composition, and assuming that an SP value of the first polymerizable monomer is taken as $SP_{12}$ $(J/cm^3)^{0.5}$ and an SP value of the second polymerizable monomer is taken as $SP_{22}$ $(J/cm^3)^{0.5}$, formula (2):

$$0.60 \le (SP_{22} - SP_{12}) \le 15.00 \tag{2}$$

is satisfied, and an oil absorption of the magnetic body is 5 ml/100 g to 40 ml/100 g.

The present invention also relates to a method for manufacturing the magnetic toner, including the steps of:

melt kneading a mixture containing the binder resin and the magnetic body to obtain a kneaded product; and, pulverizing the kneaded product to obtain a pulverized product.

The present invention can provide a magnetic toner satisfactory in all of low-temperature fixability, developing performance and heat-resistant storage stability, and a method for manufacturing the magnetic toner.

Further features of the present invention will become apparent from the following description of exemplary embodiments.

DESCRIPTION OF THE EMBODIMENTS

Unless otherwise specified, descriptions of numerical ranges such as "from XX to YY" or "XX to YY" in the present invention include the numbers at the upper and lower limits of the range.

In the present invention, a (meth)acrylic acid ester means an acrylic acid ester and/or methacrylic acid ester.

In the present invention, a "monomer unit" means a reacted form of a monomer substance in a polymer.

A crystalline resin is a resin that exhibits a clear endothermic peak in differential scanning calorimetry (DSC).

Because crystalline resins and magnetic bodies have low electrical resistance, they increase the likelihood of charge leakage from the toner particle surface.

Therefore, when a large amount of a crystalline resin is included in a magnetic toner with the aim of improving low-temperature fixability, charge retention and charging uniformity decline, and image problems such as fogging and tailing are likely occurred.

Thus, in order to achieve good developing performance while improving low-temperature fixability in a magnetic toner containing a crystalline resin, it is necessary to use a crystalline material with strong charging performance, while preventing the magnetic body which has lower electrical resistance than the crystalline resin from being exposed on the toner particle surface.

Moreover, a toner containing a large amount of a crystalline resin must also have a high degree of crystallinity in order to ensure heat-resistant storage stability.

The inventors discovered that even in a magnetic toner, low-temperature fixability, developing performance and heat-resistant storage stability could be improved by combining a magnetic body with controlled surface hydrophobicity with a binder resin containing a polymer having crystalline segments and amorphous segments.

This magnetic toner is a magnetic toner, including:
a toner particle, the toner particle including a binder resin and a magnetic body, wherein
the binder resin contains a polymer A having a first monomer unit derived from a first polymerizable monomer and a second monomer unit derived from a second polymerizable monomer different from the first polymerizable monomer,
the first polymerizable monomer is at least one selected from the group consisting of (meth)acrylic acid esters each having a $C_{18-36}$ alkyl group,
a content of the first monomer unit in the polymer A is 5.0 mol % to 60.0 mol % of the total moles of all monomer units in the polymer A,
a content of the second monomer unit in the polymer A is 20.0 mol % to 95.0 mol % of the total moles of all monomer units in the polymer A, and
assuming that an SP value of the first monomer unit is taken as $SP_{11}$ $(J/cm^3)^{0.5}$ and an SP value of the second monomer unit is taken as $SP_{21}$ $(J/cm^3)^{0.5}$, formula (1):

$$3.00 \leq (SP_{21} - SP_{11}) \leq 25.00 \qquad (1)$$

is satisfied, and
an oil absorption of the magnetic body is 5 ml/100 g to 40 ml/100 g.

The magnetic toner is also a magnetic toner, including:
a toner particle, the toner particle including a binder resin and a magnetic body, wherein
the binder resin contains a polymer A that is a polymer of a composition containing a first polymerizable monomer and a second polymerizable monomer that is different from the first polymerizable monomer,
the first polymerizable monomer is at least one selected from the group consisting of (meth)acrylic acid esters each having a $C_{18-36}$ alkyl group,
a content of the first polymerizable monomer in the composition is 5.0 mol % to 60.0 mol % of the total moles of all polymerizable monomers in the composition,
a content of the second polymerizable monomer in the composition is 20.0 mol % to 95.0 mol % of the total moles of all polymerizable monomers in the composition, and
assuming that an SP value of the first polymerizable monomer is taken as $SP_{12}$ $(J/cm^3)^{0.5}$ and an SP value of the second polymerizable monomer is taken as $SP_{22}$ $(J/cm^3)^{0.5}$, formula (2):

$$0.60 \leq (SP_{22} - SP_{12}) \leq 15.00 \qquad (2)$$

is satisfied, and
an oil absorption of the magnetic body is 5 ml/100 g to 40 ml/100 g.

The polymer A is believed to have crystalline segments containing first monomer units derived from the first polymerizable monomer and high-polarity segments (or amorphous segments) containing second monomer units derived from the second polymerizable monomer.

These segments are likely to take the form of a block polymer. The crystalline segments are also likely to exhibit hydrophobicity, while the high-polarity segments are likely to exhibit hydrophilicity.

The charging performance of the polymer A is improved because the polymer A has segments exhibiting hydrophilicity.

When a binder resin containing the polymer A is combined with a magnetic body having controlled oil absorption and a hydrophobized surface, moreover, it is thought that the hydrophobic crystalline segments of the polymer A are likely to interact with the hydrophobized surface of the magnetic body, causing the surface of the magnetic body to be coated with the polymer A.

When the magnetic body is coated by the polymer A, exposure of the magnetic body on the toner particle surface is controlled, and charge leakage from the charged toner particles is reduced. The charge retention and charging uniformity (sometimes called collectively "charging performance" below) are improved as a result, and good developing performance is obtained.

The binder resin contains a polymer A having a first monomer unit derived from a first polymerizable monomer and a second monomer unit derived from a second polymerizable monomer different from the first polymerizable monomer.

The binder resin contains a polymer A that is a polymer of a composition containing a first polymerizable monomer and a second polymerizable monomer different from the first polymerizable monomer.

The first polymerizable monomer is at least one selected from the group consisting of (meth)acrylic acid esters each having a $C_{18-36}$ alkyl group. Because it has the first monomer unit, the polymer A is a resin exhibiting crystallinity.

If the carbon number is within the above range, the melting point of the polymer A will be from 50° C. to 80° C., resulting in good low-temperature fixability and heat-resistant storage stability.

The content of the first monomer unit in the polymer A is 5.0 mol % to 60.0 mol % of the total moles of all monomer units in the polymer A.

The content of the first monomer unit is preferably 10.0 mol % to 60.0 mol %, or more preferably 20.0 mol % to 40.0 mol %.

If the content is less than 5.0 mol %, low-temperature fixability declines, while if it exceeds 60.0 mol %, developing performance declines.

Furthermore, the content of the first polymerizable monomer in the composition is 5.0 mol % to 60.0 mol % of the total moles of all polymerizable monomers in the composition.

The content of the first polymerizable monomer is preferably 10.0 mol % to 60.0 mol %, or more preferably 20.0 mol % to 40.0 mol %.

If the content is less than 5.0 mol %, low-temperature fixability declines, while if it exceeds 60.0 mol %, developing performance declines.

The content of the second monomer unit in the polymer A is 20.0 mol % to 95.0 mol % of the total moles of all monomer units in the polymer A.

The content of the second monomer unit is preferably 40.0 mol % to 95.0 mol %, or more preferably 40.0 mol % to 70.0 mol %.

Furthermore, the content of the second polymerizable monomer in the composition is 20.0 mol % to 95.0 mol % of the total moles of all polymerizable monomers in the composition.

The content of the second polymerizable monomer is preferably 40.0 mol % to 95.0 mol %, or more preferably 40.0 mol % to 70.0 mol %.

If the content is within the above range, the degree of crystallinity of the first monomer units in the polymer A is improved, resulting in improved low-temperature fixability and heat-resistant storage stability. The high-polarity segments can also maintain sufficient charging performance, and developing performance is improved.

When the polymer A has two or more kinds of monomer units derived from (meth)acrylic acid esters each having a $C_{18-36}$ alkyl group, the content of the first monomer unit represents the molar ratio of the total of these. When the composition used for the polymer A contains two or more (meth)acrylic acid esters each having a $C_{18-36}$ alkyl group, moreover, the content of the first polymerizable monomer represents the molar ratio of the total of these.

Furthermore, when two or more kinds of monomer units derived from second polymerizable monomers satisfying the formula (1) are present in the polymer A, the ratio of the second monomer unit represents the molar ratio of the total of these. When the composition used for the polymer A contains two or more kinds of the second polymerizable monomer, moreover, the content of the second polymerizable monomer represents the molar ratio of the total of these.

Assuming that an SP value of the first monomer unit is taken as $SP_{11}$ $(J/cm^3)^{0.5}$ and an SP value of the second monomer unit is taken as $SP_{21}$ $(J/cm^3)^{0.5}$, formula (1) below is satisfied.

Assuming that an SP value of the first polymerizable monomer is taken as $SP_{12}$ $(J/cm^3)^{0.5}$ and an SP value of the second polymerizable monomer is taken as $SP_{22}$ $(J/cm^3)^{0.5}$, formula (2) below is satisfied.

$$3.00 \leq (SP_{21} - SP_{11}) \leq 25.00 \quad (1)$$

$$0.60 \leq (SP_{22} - SP_{12}) \leq 15.00 \quad (2)$$

SP values in the present invention are given in units of $(J/m^3)^{0.5}$, but these can be converted to units of $(cal/cm^3)^{0.5}$ using the formula 1 $(cal/cm^3)^{0.5} = 2.045 \times 10^3$ $(J/m^3)^{0.5}$.

The value of $SP_{21} - SP_{11}$ is preferably 5.00 $(J/cm^3)^{0.5}$ to 22.00 $(J/cm^3)^{0.5}$, or more preferably 7.00 $(J/cm^3)^{0.5}$ to 20.00 $(J/cm^3)^{0.5}$. If $SP_{11}$ and $SP_{21}$ are in this relationship, the degree of block formation of the polymer A increases, and heat-resistant storage stability and developing performance are improved.

The value of $SP_{22} - SP_{12}$ is preferably 3.50 $(J/cm^3)^{0.5}$ to 12.00 $(J/cm^3)^{0.5}$, or more preferably 4.00 $(J/cm^3)^{0.5}$ to 11.00 $(J/cm^3)^{0.5}$. If $SP_{12}$ and $SP_{22}$ are in this relationship, the degree of block formation of the polymer A increases, and heat-resistant storage stability and developing performance are improved.

When multiple kinds of monomer units fulfilling the conditions for the first monomer unit are present in the polymer A in the present invention, the value of $SP_{11}$ in the formula (1) is a weighted average of the SP values of each of these monomer units. For example, if the polymer contains a monomer unit A with an SP value of $SP_{111}$ in the amount of A mol % of the total moles of all monomer units fulfilling the conditions for the first monomer unit and a monomer unit B with an SP value of $SP_{112}$ in the amount of (100−A) mol % of the total moles of all monomer units fulfilling the conditions for the first monomer unit, the SP value ($SP_{11}$) becomes:

$$SP_{11} = (SP_{111} \times A + SP_{112} \times (100-A))/100.$$

The calculation is similar when three or more monomer units fulfilling the conditions for the first monomer unit are included. Similarly, $SP_{12}$ also represents an average value calculated based on the molar ratios of the respective first polymerizable monomers.

Moreover, the second monomer unit in the present invention corresponds to all monomer units having $SP_{21}$ values satisfying formula (1) in combination with the $SP_{11}$ value calculated by the methods described above. Similarly, the second polymerizable monomer corresponds to all polymerizable monomers having $SP_{22}$ values satisfying formula (2) in combination with the $SP_{12}$ value calculated by the methods described above.

That is, when the second polymerizable monomer is two or more kinds of polymerizable monomer, $SP_{21}$ represents the SP values of monomer units derived from each of the polymerizable monomers, and $SP_{21} - SP_{11}$ is determined for the monomer units derived from each of the second polymerizable monomers. Similarly, $SP_{22}$ represents the SP values of each of the polymerizable monomers, and $SP_{22} - SP_{12}$ is determined for each of the second polymerizable monomers.

The first polymerizable monomer is at least one selected from the group consisting of (meth)acrylic acid esters each having a $C_{18-36}$ alkyl group.

Examples of (meth)acrylic acid esters each having a $C_{18-36}$ alkyl group include (meth)acrylic acid esters having $C_{18-36}$ straight-chain alkyl groups [stearyl (meth)acrylate, nonadecyl (meth)acrylate, eicosyl (meth)acrylate, heneicosanyl (meth)acrylate, behenyl (meth)acrylate, lignoceryl (meth)acrylate, ceryl (meth)acrylate, octacosyl (meth)acrylate, myricyl (meth)acrylate, dotriacontyl (meth)acrylate, etc.] and (meth)acrylic acid esters each having a $C_{18-36}$ branched alkyl group [2-decyltetradecyl (meth)acrylate, etc.].

Of these, at least one selected from the group consisting of (meth)acrylic acid esters each having a $C_{18-36}$ straight-chain alkyl group is preferred from the standpoint of the storage stability of the toner. At least one selected from the group consisting of (meth)acrylic acid esters each having a $C_{18-30}$ straight-chain alkyl group is more preferred, and at least one selected from the group consisting of straight-chain stearyl (meth)acrylate and behenyl (meth)acrylate is still more preferred.

One kind of monomer alone or a combination of two or more kinds may be used for the first polymerizable monomer.

Of the polymerizable monomers given below for example, a polymerizable monomer satisfying formula (1) or (2) may be used as the second polymerizable monomer. One kind of monomer alone or a combination of two or more kinds may be used for the second polymerizable monomer.

Monomers having a nitrile group: for example, acrylonitrile, methacrylonitrile and the like.

Monomers having a hydroxy group: for example, 2-hydroxyethyl (meth)acrylate, 2-hydroxypropyl (meth)acrylate and the like.

Monomers having an amido group: for example, acrylamide and monomers obtained by reacting $C_{1-30}$ amines with $C_{2-30}$ carboxylic acids having ethylenically unsaturated bonds (acrylic acid, methacrylic acid, etc.) by known methods.

Monomers having a urethane group: for example, monomers obtained by reacting $C_{2-22}$ alcohols having ethylenically unsaturated bonds (2-hydroxyethyl methacrylate, vinyl alcohol, etc.) by known methods with $C_{1-30}$ isocyanates [monoisocyanate compounds (benzenesulfonyl isocyanate, tosyl isocyanate, phenyl isocyanate, p-chlorophenyl isocyanate, butyl isocyanate, hexyl isocyanate, t-butyl isocyanate, cyclohexyl isocyanate, octyl isocyanate, 2-ethylhexyl isocyanate, dodecyl isocyanate, adamantyl isocyanate, 2,6-dimethylphenyl isocyanate, 3,5-dimethylphenyl isocyanate and 2,6-dipropylphenyl isocyanate, etc.), aliphatic diisocyanate compounds (trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate and 2,4,4-trimethylhexamethylene diisocyanate, etc.), alicyclic diisocyanate compounds (1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate and hydrogenated tetramethylxylylene diisocyanate, etc.) and aromatic diisocyanate compounds (phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate and xylylene diisocyanate, etc.) and the like], and monomers obtained by reacting $C_{1-26}$ alcohols (methanol, ethanol, propanol, isopropyl alcohol, butanol, t-butyl alcohol, pentanol, heptanol, octanol, 2-ethylhexanol, nonanol, decanol, undecyl alcohol, lauryl alcohol, myristyl alcohol, pentadecyl alcohol, cetanol, heptadecanol, stearyl alcohol, isostearyl alcohol, elaidyl alcohol, oleyl alcohol, linoleyl alcohol, linolenyl alcohol, nonadecyl alcohol, heneicosanol, behenyl alcohol, erucyl alcohol, etc.) by known methods with $C_{2-30}$ isocyanates having ethylenically unsaturated bonds [2-isocyanatoethyl (meth)acrylate, 2-(0-[1'-methylpropylidenamino]carboxyamino) ethyl (meth)acrylate, 2-[(3,5-dimethylpyrazolyl)carbonylamino] ethyl (meth)acrylate and 1,1-(bis(meth)acryloyloxymethyl) ethyl isocyanate, etc.] and the like.

Monomers having a urea group: for example, monomers obtained by reacting $C_{3-22}$ amines [primary amines (normal butylamine, t-butylamine, propylamine, and isopropylamine, etc.), secondary amines (diethylamine, di-normal propylamine, di-normal butylamine, etc.), aniline, cycloxylamines and the like] by known methods with $C_{2-30}$ isocyanates having ethylenically unsaturated bonds and the like.

Monomers having a carboxyl group: for example, methacrylic acid, acrylic acid, 2-carboxyethyl (meth)acrylate.

Of these, it is desirable to use a monomer having a nitrile, amido, urethane, hydroxy or urea group. More preferably, the second polymerizable monomer is a monomer having an ethylenically unsaturated bond and at least one functional group selected from the group consisting of the nitrile, amido, hydroxy, urethane and urea groups.

The vinyl esters such as vinyl acetate, vinyl propionate, vinyl butyrate, vinyl caproate, vinyl caprylate, vinyl caprate, vinyl laurate, vinyl myristate, vinyl palmitate, vinyl stearate, vinyl pivalate and vinyl octylate can also be used by preference as the second polymerizable monomer. Vinyl esters are nonconjugated monomers and can easily maintain an appropriate degree of reactivity with the first polymerizable monomer.

It is thought that because of this, the monomer units derived from the first polymerizable monomer are more likely to aggregate and form bonded states in the polymer A.

That is, the degree of block formation by the monomer units derived from the first polymerizable monomer is increased, making it easier to increase the crystallinity of the segments derived from the first polymerizable monomer and achieve both low-temperature fixability and heat-resistant storage stability.

The second polymerizable monomer preferably has an ethylenically unsaturated bond, and more preferably has one ethylenically unsaturated bond.

Moreover, the second polymerizable monomer is preferably at least one selected from the group consisting of the following formulae (A) and (B).

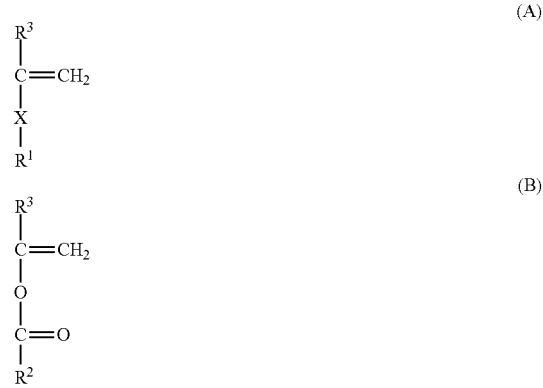

In formula A,

X represents a single bond or a $C_{1-6}$ alkylene group, and $R^1$ represents a nitrile group (—C≡N);

an amido group (—C(=O)NHR$^{10}$, with $R^{10}$ being a hydrogen atom or a $C_{1-4}$ alkyl group);

a hydroxy group;

—COOR¹ (with R¹¹ being a $C_{1-6}$ (preferably $C_{1-4}$) alkyl group or a $C_{1-6}$ (preferably $C_{1-4}$) hydroxyalkyl group);

a urea group (—NH—C(=O)—N(R¹³)₂ in which R¹³s are each independently a hydrogen atom or a $C_{1-6}$ (preferably $C_{1-4}$) alkyl group);

—COO(CH₂)₂NHCOOR¹⁴ (with R¹⁴ being a $C_{1-4}$ alkyl group); or

—COO(CH₂)₂—NH—C(=O)—N(R¹⁵)₂ (in which R¹⁵s are each independently a hydrogen atom or a $C_{1-6}$ (preferably $C_{1-4}$) alkyl group), R³ is a hydrogen atom or a methyl group.

In formula B,

R² is a $C_{1-4}$ alkyl group, and

R³ is a hydrogen atom or a methyl group.

A monomer unit in the present invention is defined as one carbon-carbon bonded section in a principal chain composed of polymerized vinyl monomers in a polymer.

A vinyl monomer can be represented by formula (Z) below:

in formula (Z), $R_{Z1}$ represents a hydrogen atom or an alkyl group (preferably a $C_{1-3}$ alkyl group, or more preferably a methyl group), and $R_{Z2}$ represents an optional substituent.

The polymer A is preferably a vinyl polymer. The vinyl polymer may be a polymer of a monomer containing an ethylenically unsaturated bond for example. An ethylenically unsaturated bond is a radical polymerizable carbon-carbon double bond, and examples include vinyl, propenyl, acryloyl and methacryloyl groups and the like.

The polymer A may also contain a monomer unit derived from a third polymerizable monomer outside the scope of the formula (1) and formula (2) as long as the molar ratios of the first monomer unit derived from the first polymerizable monomer and the second monomer unit derived from the second polymerizable monomer are preserved.

Moreover, the composition containing the first polymerizable monomer and the second polymerizable monomer different from the first polymerizable monomer may also contain a third polymerizable monomer outside the scope of the formula (1) and formula (2) as long as the content of the first polymerizable monomer and the content of the second polymerizable monomer in the composition are preserved.

Of the monomers given as examples of the second polymerizable monomer, those that do not satisfy formula (1) or formula (2) above may be used as the third polymerizable monomer.

The following monomers may also be used for example: styrenes such as styrene and o-methylstyrene and their derivatives, and (meth)acrylic acid esters such as n-butyl (meth)acrylate, t-butyl (meth)acrylate and 2-ethylhexyl (meth)acrylate. Because they lack polar groups, these monomers have low SP values and are thus unlikely to satisfy formula (1) or formula (2). However, they may be used as the second polymerizable monomer if they do satisfy formula (1) or formula (2).

To improve the storability of the toner, the third polymerizable monomer is preferably at least one selected from the group consisting of styrene, methyl methacrylate and methyl acrylate.

The acid value of the polymer A is preferably not more than 30.0 mg KOH/g, or more preferably not more than 20.0 mg KOH/g. If the acid value exceeds 30.0 mg KOH/g, crystallization of the polymer A is likely to be inhibited, potentially causing a decline in the melting point. The acid value of the polymer A is preferably at least 0 mg KOH/g.

The weight-average molecular weight (Mw) of the tetrahydrofuran (THF)-soluble component of the polymer A as measured by gel permeation chromatography (GPC) is preferably 10,000 to 200,000, or more preferably 20,000 to 150,000.

If the weight-average molecular weight (Mw) is within this range, it is easy to maintain elasticity near room temperature.

The melting point of the polymer A is preferably 50° C. to 80° C., or more preferably 53° C. to 70° C. If the melting point is within this range, heat-resistant storage stability and low-temperature fixability are further improved.

The binder resin contained in the toner particle preferably contains a polymer B different from the polymer A.

Examples of the polymer B include vinyl resins, polyester resins, epoxy resins and polyurethane resins. Of these, a vinyl resin or polyester resin makes it easier to control the crosslinking density, and is desirable from the standpoint of controlling viscoelasticity at high temperatures.

From the standpoint of heat-resistant storage stability, the glass transition temperature (Tg) of the polymer B is preferably at least 55° C., or more preferably at least 60° C., or still more preferably at least 65° C. From the standpoint of not inhibiting the low-temperature fixability of the polymer A, the glass transition temperature (Tg) is preferably not more than 90° C., or more preferably not more than 80° C.

The content of the polymer A in the binder resin is preferably at least 50.0 mass %. If the content is at least 50.0 mass %, it is easier to maintain the sharp melt property of the toner particle, and improve low-temperature fixability. The content is more preferably 60.0 mass % to 100.0 mass %, or still more preferably 70.0 mass % to 90.0 mass %.

The content of the polymer B in the binder resin is preferably 0.0 mass % to 40.0 mass %, or more preferably 10.0 mass % to 30.0 mass %.

Examples of polymerizable monomers that can be used in vinyl resins include polymerizable monomers usable as the first polymerizable monomer, second polymerizable monomer and third polymerizable monomer described above. A combination of two or more kinds may be used as necessary.

When a vinyl resin is used for the polymer B, it preferably has a crosslinked structure obtained by crosslinking with a crosslinking agent having two or more vinyl groups. Examples of the crosslinking agent used in this case include the following:

aromatic divinyl compounds (divinyl benzene, divinyl naphthalene); diacrylate compounds connected by alkyl chains (ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, and these compounds with methacrylate substituted for the acrylate); diacrylate compounds connected by alkyl chains containing ether linkages (for example, diethylene glycol diacrylate, triethylene glycol diacrylate, tetraethylene glycol diacrylate, polyethylene glycol #400 diacrylate, polyethylene glycol #600 diacrylate, dipropylene glycol diacrylate, and these compounds with methacrylate substituted for the acrylate); diacrylate compounds connected by chains containing aromatic groups and ether linkages [polyoxyethylene (2)-2,2-bis(4-hydroxyphenyl) propane diacrylate, polyoxyethylene (4)-2,2-bis(4-hydroxyphenyl) propane diacrylate, and these compounds with methacrylate substituted for the acrylate]; and polyester diacrylate compounds.

The following are examples of multifunctional crosslinking agents: pentaerythritol triacrylate, trimethylol ethane triacrylate, trimethylol propane triacrylate, tetramethylol methane tetraacrylate, oligoester acrylates, and these compounds with methacrylate substituted for the acrylate; and triallyl cyanurate and triallyl trimellitate.

These crosslinking agents may be used in the amount of preferably from 0.01 parts by mass to 10.00 parts by mass, or more preferably from 0.03 parts by mass to 5.00 parts by mass per 100 parts by mass of the monomer components other than the crosslinking agent.

Of these crosslinking agents, aromatic divinyl compounds (especially divinyl benzene) and diacrylate compounds connected by chains containing aromatic groups and ether linkages are examples of agents that can be used by preference in the binder resin from the standpoint of the offset resistance and fixability.

When a polyester resin is used for the polymer B, moreover, this polyester resin preferably has a monomer unit derived from a polyhydric alcohol and a monomer unit derived from a polyvalent carboxylic acid.

Examples of the polyvalent carboxylic acid include the following compounds: dibasic acids such as succinic acid, adipic acid, sebacic acid, phthalic acid, isophthalic acid, terephthalic acid, malonic acid and dodecenylsuccinic acid, and anhydrides and lower alkyl esters of these, as well as aliphatic unsaturated dicarboxylic acids such as maleic acid, fumaric acid, itaconic acid and citraconic acid; and 1,2,4-benzenetricarboxylic acid, 1,2,5-benzenetricarboxylic acid, and anhydrides and lower alkyl esters of these. One of these alone or a combination of two or more may be used.

Examples of the polyhydric alcohol include the following compounds: alkylene glycols (ethylene glycol, 1,2-propylene glycol and 1,3-propylene glycol); alkylene ether glycols (polyethylene glycol and polypropylene glycol); alicyclic diols (1,4-cyclohexane dimethanol); bisphenols (bisphenol A); and alkylene oxide (ethylene oxide and propylene oxide) adducts of alicyclic diols or bisphenols.

The alkyl parts of alkylene glycols and alkylene ether glycols may be either straight-chain or branched. Other examples include glycerin, trimethylol ethane, trimethylol propane and pentaerythritol. One of these alone or a combination of two or more may be used.

A monovalent acid such as acetic acid or benzoic acid or a monohydric alcohol such as cyclohexanol or benzyl alcohol may also be used as necessary to adjust the acid value or hydroxy value.

Moreover, assuming that an SP value of the polymer B is taken as SP (B), preferably the following formula (5) and formula (6) are satisfied:

$$0(J/cm^3)^{0.5} \leq SP_{21} - SP(B) \leq 4.0(J/cm^3)^{0.5} \quad (5)$$

$$SP_{11} \leq SP(B) \leq SP_{21} \quad (6).$$

If these formula are satisfied, the hydrophilic segments of the polymer B and polymer A are more likely to interact, and the dispersibility of the polymer A can be improved while maintaining the interaction between the magnetic body and the hydrophobic segments of the polymer A. The charge retention and charging uniformity of the toner are improved as a result, and good developing performance is obtained.

The acid value of the polymer B is preferably 0.1 mg KOH/g to 25.0 mg KOH/g, or more preferably 2.0 mg KOH/g to 20.0 mg KOH/g, or still more preferably 5.0 mg KOH/g to 15.0 mg KOH/g.

If the acid value of the polymer B is within this range, moisture resistance is improved, and both heat-resistant storage stability and developing performance can be obtained.

Examples of the magnetic body include magnetic iron oxides such as magnetite, maghemite and ferrite, and magnetic iron oxides containing other metal oxides; metals such as Fe, Co and Ni; alloys of these metals with metals such as Al, Co, Cu, Pb, Mg, Ni, Sn, Zn, Sb, Be, Bi, Cd, Ca, Mn, Se, Ti, W and V; and mixtures of these.

The oil absorption of the magnetic body is 5 ml/100 g to 40 ml/100 g.

The oil absorption is preferably 10 ml/100 g to 35 ml/100 g, or more preferably 20 ml/100 g to 30 ml/100 g.

Oil absorption is an indicator used to assess the degree of structure of the magnetic body, or in other words the complex aggregation caused by chemical and physical bonding, but is thought that it can also serve to indicate affinity for oil components, or in other words the hydrophobicity of the magnetic body.

If the oil absorption is within the above range, developing performance is improved because of increased interaction between the surface of the magnetic body and hydrophobic segments derived from the first monomer unit in the polymer A, and also because the magnetic body has good dispersibility in the binder resin.

The number-average particle diameter of the magnetic body is preferably 50 nm to 400 nm, or more preferably 50 nm to 150 nm. If the number-average particle diameter is within this range, the dispersibility of the magnetic body in the binder resin is improved, and developing performance is further improved because it is easy to control the oil absorption within the aforementioned range.

The BET specific surface area of the magnetic body is preferably 5 m$^2$/g to 25 m$^2$/g, or more preferably 10 m$^2$/g to 20 m$^2$/g. If the BET specific surface area is within this range, developing performance is further improved because the oil absorption is more easily controlled.

The BET specific surface area can be adjusted to the aforementioned range by controlling the shape of the magnetic body, the number-average particle diameter of the magnetic body and the like.

The volume resistivity obtained by AC impedance measurement of the magnetic toner is preferably at least 1.0×10$^{11}$ Ω·cm, or more preferably at least 1.0×10$^{12}$ Ω·cm. If this condition is fulfilled, the charge retention and charging uniformity of the magnetic toner can be further improved, thereby improving developing performance.

The volume resistivity is preferably not more than 1.0×10$^{15}$ Ω·cm, or more preferably not more than 1.0×10$^{14}$ Ω·cm.

These numerical ranges can be arbitrarily combined.

The content of the magnetic body in the magnetic toner is preferably 30 parts by mass to 100 parts by mass, or more preferably 40 parts by mass to 80 parts by mass per 100 parts by mass of the binder resin.

If the content of the magnetic body is within this range, the developing performance is further improved because volume resistivity can be controlled at an appropriate level, and because the toner can be provided with suitable magnetic properties.

The magnetic body preferably comprises a magnetic core particle and a coat layer on the surface of the magnetic core particle.

The coat layer may coat all areas on the surface of the magnetic core particle uniformly, or may leave part of the surface of the magnetic core particle exposed. In either coating mode, the coat layer is preferably the outermost layer, and preferably coats the surface of the magnetic core particle thinly.

The coat layer preferably contains silicon atoms and aluminum atoms.

Moreover, preferably formulae (3) and (4) below are satisfied, or more preferably formulae (3)' and (4)' below are satisfied in measurement of the surface of the magnetic body by X-ray photoelectron spectroscopy.

$$0.10 \leq dSi/dFe \leq 4.00 \quad (3)$$

$$0.50 \leq dSi/dFe \leq 2.50 \quad (3)'$$

$$0.03 \leq dAl/dFe \leq 2.00 \quad (4)$$

$$0.10 \leq dAl/dFe \leq 1.00 \quad (4)'$$

In formula (3) and formula (4), dSi represents the atomic % of silicon atoms, dAl represents the atomic % of aluminum atoms, and dFe represents the atomic % of iron atoms.

If the contents of silicon atoms and aluminum atoms on the surface of the magnetic body are within these ranges, developing performance is further improved because the oil absorption of the magnetic body can be controlled appropriately, and because the magnetic toner has better flowability.

Methods of forming the coat layer include methods of treatment with water-soluble silicate salts and water-soluble aluminum salts, and methods of treatment with coupling agents such as silane coupling agents and titanate coupling agents. The treatment amount is preferably 0.05 parts by mass to 20 parts by mass, or more preferably 0.1 to 10 parts by mass per 100 parts by mass of the magnetic body before treatment.

To facilitate formation of the coat layer and further improve the magnetic properties, dispersibility and tinting strength, the magnetic body preferably has an octahedral shape.

A conventional known method may be adopted for controlling the shape and number-average particle diameter of the magnetic body.

One method for giving the magnetic body an octahedral shape is to have a pH of at least 9 during the wet oxidation reaction when manufacturing the magnetic core particle.

The volume resistivity obtained by AC impedance measurement of the magnetic body is preferably at least $1.0 \times 10^4$ Ω·cm, or more preferably at least $1.0 \times 10^5$ Ω·cm. If this condition is fulfilled, the volume resistivity of the magnetic toner can be controlled within the aforementioned range, thereby improving developing performance.

The volume resistivity obtained by AC impedance measurement of the magnetic body is preferably not more than $1.0 \times 10^8$ Ω·cm, or more preferably not more than $1.0 \times 10^7$ Ω·cm.

These numerical ranges can be arbitrarily combined.

The toner particle may also contain a wax.

The type of wax is not particularly limited, and a conventional known wax may be used.

Specific examples include:

aliphatic hydrocarbon waxes such as low-molecular-weight polyethylene, low-molecular-weight polypropylene, polyolefin copolymers, polyolefin waxes, microcrystalline wax, paraffin wax and Fischer-Tropsch wax; oxides of aliphatic hydrocarbon waxes, such as polyethylene oxide wax; block copolymers of these; plant-based waxes such as candelilla wax, carnauba wax, Japan wax and jojoba wax; animal-based waxes such as beeswax, lanolin and spermaceti; mineral waxes such as ozokerite, ceresin and petrolactam; waxes consisting primarily of aliphatic esters, such as montanic acid ester wax and castor wax; and partially or fully deoxidized aliphatic esters such as deoxidized carnauba wax.

The content of the wax in the toner particle is preferably 1.0 mass % to 30.0 mass % or more preferably 2.0 mass % to 25.0 mass %.

The toner particle may also contain a charge control agent to stabilize the charging properties.

Organic metal complexes and chelate compounds are effective as charge control agents because the central metals interact readily with acid groups or hydroxy groups at the ends of the binder resin.

Specific examples include monoazo metal complexes, acetylacetone metal complexes, and metal complexes or metal salts of aromatic hydroxycarboxylic acids or aromatic dicarboxylic acids.

The toner particle may also contain a colorant apart from the magnetic body. The colorant may be a known organic pigment, organic dye or inorganic pigment, or carbon black as a black colorant.

The method for manufacturing the magnetic toner is not particularly limited, and a known manufacturing method such as pulverization, suspension polymerization, dissolution suspension, emulsion aggregation or dispersion polymerization may be used.

The magnetic toner here is preferably a melt kneaded toner.

The method for manufacturing the magnetic toner comprises a step of melt kneading a mixture containing the binder resin and the magnetic body, and a step of pulverizing the kneaded product to obtain a pulverized product.

The pulverization method is explained here in more detail.

(i) The binder resin and magnetic body for constituting the toner particle, together with a wax and other additives as necessary, are thoroughly mixed in a mixer such as a Henschel mixer or ball mill to prepare a mixture containing the binder resin and the magnetic body.

(ii) The resulting mixture is melt kneaded with a heat kneading apparatus such as a twin-screw extruder, heating roll, kneader or extruder to blend the resins as the magnetic body and other additives are dispersed or dissolved to prepare a kneaded product.

(iii) The resulting kneaded product is cooled and solidified, and then pulverized to obtain a pulverized product.

(iv) The resulting pulverized product is classified and the like to obtain a toner particle.

This process may also include a surface treatment step in which the toner particle is passed through a surface treatment apparatus that applies continuous mechanical impact force after pulverization and classification in order to control the shape and surface properties of the toner particle.

The surface shape of the toner particle can be controlled by controlling the treatment time in this surface treatment step.

The toner may then be mixed with desired external additives as necessary in a mixing apparatus such as a Henschel mixer to obtain a toner.

Examples of the mixer include the following: FM mixer (Nippon Coke & Engineering), Super Mixer (Kawata), Ribocone (Okawara Mfg.), Nauta Mixer, Turbulizer, Cyclomix (Hosokawa Micron), Spiral Pin Mixer (Pacific Machinery & Engineering) and Lödige Mixer (Matsubo).

Examples of kneaders include the following: KRC kneader (Kurimoto), Buss Co-kneader (Buss), TEM extruder (Toshiba Machine), TEX twin-screw kneader (Japan Steel Works), PCM kneader (Ikegai Iron Works), three-roll mill, mixing roll mill, kneader (Inoue Mfg.), Kneadex (Mitsui Mining), MS pressure kneader, Kneader-Ruder (Moriyama Seisakusho) and Banbury Mixer (Kobe Steel).

Examples of pulverizers include the following: Counter Jet Mill, Micron Jet and Inomizer (Hosokawa Micron), IDS mill and PJM Jet Pulverizer (Nippon Pneumatic), Cross Jet Mill (Kurimoto), Ulmax (Nisso Engineering), SK Jet-O-Mill (Seishin Enterprise), Kryptron (Kawasaki Heavy Industries), Turbo Mill (Turbo Kogyo) and Super Rotor (Nisshin Engineering).

Examples of classifiers include the following: Classiell, Micron Classifier, Spedic Classifier (Seishin Enterprise), Turbo Classifier (Nisshin Engineering); Micron Separator, Turboplex (ATP); TSP Separator (Hosokawa Micron); Elbow Jet (Nittetsu Mining), Dispersion Separator (Nippon Pneumatic Mfg.) and YM Micro Cut (Yasukawa Shoji).

Examples of surface modification devices include the following: Faculty (Hosokawa Micron), Mechano Fusion (Hosokawa Micron), Nobilta (Hosokawa Micron), Hybridizer (Nara Machinery), Inomizer (Hosokawa Micron), Theta Composer (Tokuju Corp.) and Mechano Mill (Okada Seiko).

Examples of sieving devices for sieving out coarse particles include the following: Ultrasonic (Ryoei Sangyo); Resonator Sieve, Gyro Sifter (Tokuju Corp.); Hybrasonic System (Dalton); Soniclean (Sintokogio); Turbo Screener (Turbo Kogyo); Microsifter (Hino Industry); and circular vibrating screens.

The magnetic toner may also contain an external additive.

Examples of external additives include fluorine resin powders such as vinylidene fluoride fine powder and polytetrafluoroethylene fine powder; silica fine particles such as wet silica and dry silica, titanium oxide fine particles, alumina fine particles, and treated fine particles obtained by surface treating these with silane compounds, titanium coupling agents and silicone oil; oxides such as zinc oxide and tin oxide; composite oxides such as strontium titanate, barium titanate, calcium titanate, strontium zirconate and calcium zirconate; and carbonate compounds such as magnesium carbonate.

Of these, a silica fine particle produced by vapor phase oxidation of a silicon halide compound is preferred. A specific example of vapor phase oxidation uses a thermal decomposition oxidation reaction of silicon tetrachloride gas in oxyhydrogen, as represented by the following basic reaction formula:

$$SiCl_4 + 2H_2 + O_2 \rightarrow SiO_2 + 4HCl.$$

In this manufacturing step, a composite fine particle of silica with another metal oxide can be obtained by using a silicon halide compound in combination with another metal halide compound such as aluminum chloride or titanium chloride, and these particles are also considered silica fine particles.

Examples of commercial silica fine particles produced by vapor phase oxidation of silicon halide compounds include the following: AEROSIL 130, 200, 300, 380, TT600, MOX170, MOX80, COK84 (Nippon Aerosil); Ca—O—SiLM-5, MS-7, MS-75, HS-5, EH-5 (Cabot Co.); Wacker HDK N20, V15, N20E, T30, T40 (Wacker-Chemie GmbH); D-C Fine Silica (Dow Corning); and Fransol (Fransil Co.).

The content of the external additive is preferably 0.1 parts by mass to 4.0 parts by mass, or more preferably 0.2 parts by mass to 3.5 parts by mass per 100.0 parts by mass of the toner particle.

The methods for measuring the various physical properties in the present invention are explained next.

Method for Measuring Contents of Monomer Units Derived from Each Polymerizable Monomer in Polymer A The contents of the monomer units derived from each polymerizable monomer in the polymer A are measured by $^1$H-NMR under the following conditions.

Measurement unit: FT NMR unit JNM-EX400 (JEOL Ltd.)
Measurement frequency: 400 MHz
Pulse condition: 5.0 μs
Frequency range: 10,500 Hz
Number of integrations: 64
Measurement temperature: 30° C.
Sample: Prepared by placing 50 mg of the measurement sample in a sample tube with an inner diameter of 5 mm, adding deuterated chloroform ($CDCl_3$) as a solvent, and dissolving this in a thermostatic tank at 40° C.

Of the peaks attributable to constituent elements of the monomer unit derived from the first polymerizable monomer in the resulting $^1$H-NMR chart, a peak independent of peaks attributable to constituent elements of otherwise-derived monomer units is selected, and the integrated value $S_1$ of this peak is calculated.

Similarly, a peak independent of peaks attributable to constituent elements of otherwise-derived monomer units is selected from the peaks attributable to constituent elements of the monomer unit derived from the second polymerizable monomer, and the integrated value $S_2$ of this peak is calculated.

When a third polymerizable monomer is used, a peak independent of peaks attributable to constituent elements of otherwise-derived monomer units is selected from the peaks attributable to constituent elements of the monomer unit derived from the third polymerizable monomer, and the integrated value $S_3$ of this peak is calculated.

The content of the monomer unit derived from the first polymerizable monomer is determined as follows using the integrated values $S_1$, $S_2$ and $S_3$. $n_1$, $n_2$ and $n_3$ are the numbers of hydrogen atoms in the constituent elements to which the observed peaks are attributed for each segment.

Content (mol %) of monomer unit derived from first polymerizable monomer:

$$\{(S_1/n_1)/((S_1/n_1)+(S_2/n_2)+(S_3/n_3))\} \times 100.$$

The monomer units derived from the second and third polymerizable monomers are determined in the same way as shown below.

Content (mol %) of monomer unit derived from second polymerizable monomer:

$$\{(S_2/n_2)/((S_1/n_1)+(S_2/n_2)+(S_3/n_3))\} \times 100.$$

Content (mol %) of monomer unit derived from third polymerizable monomer:

$$\{(S_3/n_3)/((S_1/n_1)+(S_2/n_2)+(S_3/n_3))\} \times 100.$$

When a polymerizable monomer not containing a hydrogen atom in a constituent element other than a vinyl group is used in the polymer A, measurement is performed in single pulse mode using $^{13}$C-NMR with $^{13}$C as the measured nucleus, and the ratio is calculated in the same way as by $^1$H-NMR.

Method for Calculating SP Value $SP_{12}$ and $SP_{22}$ are determined as follows following the calculation methods proposed by Fedors.

The evaporation energy (Δei) (cal/mol) and molar volume (Δvi) ($cm^3$/mol) are determined from the tables described in "Polym. Eng. Sci., 14(2), 147-154 (1974)" for the atoms or atomic groups in the molecular structures of each of the polymerizable monomers, and $(4.184 \times \Sigma \Delta ei/\Sigma \Delta vi)^{0.5}$ is given as the SP value $(J/cm^3)^{0.5}$.

$SP_{11}$ and $SP_{21}$ are calculated by similar methods for the atoms or atomic groups in the molecular structures of the same polymerizable monomers with the double bonds cleaved by polymerization.

Method for Measuring Melting Point

The melting point of the polymer A is measured under the following conditions using a DSC Q1000 (TA Instruments).
Ramp rate: 10° C./min
Measurement start temperature: 20° C.
Measurement end temperature: 180° C.

The melting points of indium and zinc are used for temperature correction of the device detection part, and the heat of fusion of indium is used for correction of the calorific value.

Specifically, 5 mg of sample is weighed precisely into an aluminum pan, and subjected to differential scanning calorimetry. An empty silver pan is used for reference.

The peak temperature of the maximum endothermic peak during the first temperature rise is given as the melting point.

When multiple peaks are present, the maximum endothermic peak is the peak at which the endothermic quantity is the greatest.

Method for Measuring Weight-Average Molecular Weight (Mw) of Polymer A

The weight-average molecular weight (Mw) of the tetrahydrofuran (THF)-soluble component of the polymer A is measured as follows by gel permeation chromatography (GPC).

First, the sample is dissolved in tetrahydrofuran (THF) over the course of 24 hours at room temperature. The resulting solution is filtered through a solvent-resistant membrane filter (Maishori Disk, Tosoh Corp.) having a pore diameter of 0.2 μm to obtain a sample solution. The concentration of THF-soluble components in the sample solution is adjusted to about 0.8 mass %. Measurement is performed under the following conditions using this sample solution.

System: HLC8120 GPC (detector: RI) (Tosoh Corp.)
Columns: seven columns of Shodex KF-801, 802, 803, 804, 805, 806 and 807 (Showa Denko)
Eluent: Tetrahydrofuran (THF)
Flow rate: 1.0 mL/min
Oven temperature: 40.0° C.
Sample injection volume: 0.10 mL A molecular weight calibration curve prepared using standard polystyrene resin (product name: "TSK standard polystyrene F-850, F-450, F-288, F-128, F-80, F-40, F-20, F-10, F-4, F-2, F-1, A-5000, A-2500, A-1000, A-500", Tosoh Corp.) is used for calculating the molecular weights of the samples.

Method for Measuring Oil Absorption of Magnetic Body

The oil absorption of the magnetic body is measured by the methods described in JIS K 5101-1978 (Pigment Testing Methods).

Specifically, 100 g of sample is taken on a glass plate, linseed oil is added dropwise, and the minimum amount of linseed oil when the sample becomes a paste is taken as the oil absorption.

Methods for Measuring Shape and Number-Average Particle Diameter of Magnetic Body To determine the number-average particle diameter of the magnetic body, the magnetic body is observed under a scanning electron microscope at a magnification of 40,000×, the maximum Feret diameters of 200 particles are measured, and the calculated average is taken as the number-average particle diameter.

The shape of the magnetic particle is also judged from the observed image. A Hitachi S-4700 is used as the scanning electron microscope.

Method for Measuring BET Specific Surface Area of Magnetic Body

The BET specific surface area of the magnetic body is measured in accordance with JIS Z8830 (2001).

The specific measurement methods are as follows.

A TriStar 3000 automatic specific surface area and pore distribution measurement device (Shimadzu Corp.) using a constant-volume gas adsorption measurement method is used as the measurement device.

The dedicated software "TriStar 3000 Version 4.00" supplied with the device is used for setting the measurement conditions and analyzing the measurement data.

A vacuum pump, nitrogen gas pipe and helium gas pipe are connected to the device.

Using nitrogen gas as the adsorption gas, a value calculated by the BET multipoint method is taken as the BET specific surface area in the present invention.

The BET specific surface area is calculated as follows.

First, nitrogen gas is adsorbed onto the magnetic body, and the equilibrium pressure P (Pa) inside the sample cell at that time and the nitrogen adsorption Va $(mol \cdot g^{-1})$ of the magnetic body are measured. The equilibrium pressure P (Pa) inside the sample cell is divided by the saturated vapor pressure of nitrogen Po (Pa) to obtain the relative pressure Pr, which is then plotted on the horizontal axis while the nitrogen adsorption Va $(mol \cdot g^{-1})$ is plotted on the vertical axis to obtain an adsorption isotherm.

Next, the monolayer adsorption amount Vm $(mol \cdot g^{-1})$, which is an adsorbed amount required to form a monolayer on the surface of the magnetic body, is determined by applying the following BET formula:

$$Pr/Va(1-Pr) = 1/(Vm \times C) + (C-1) \times Pr/(Vm \times C)$$

where C is the BET parameter, which is a variable that differs depending on the type of measurement sample, the type of adsorption gas and the adsorption temperature.

With Pr on the X axis and Pr/Va (1−Pr) on the Y axis, the BET formula can be interpreted as a straight line with a slope of (C−1)/(Vm×C) and an intercept of 1/(Vm×C) (this straight line is referred to as BET plot).

$$\text{Slope of straight line} = (C-1)/(Vm \times C)$$

$$\text{Intercept of straight line} = 1/(Vm \times C)$$

By plotting the measured value of Pr and the measured value of Pr/Va (1−Pr) on a graph and drawing a straight line by the least squares method, the slope and intercept of the line can be calculated. Vm and C can then be calculated by using these values to solve simultaneous equations of slope and intercept.

Based on the formula above, the BET specific surface area S $(m^2/g)$ can also be calculated from the Vm calculated above and the molecular occupancy cross-section (0.162 $nm^2$) of the nitrogen molecule:

$$S = Vm \times N \times 0.162 \times 10^{-18}$$

where N is the Avogadro number $(mol^{-1})$.

Measurement using this device is performed in accordance with the accessory software "TriStar 3000 manual V 4.0", and the specific procedures are as follows.

The dedicated glass sample cell (stem diameter ⅜ inch, capacity 5 mL) is thoroughly washed and dried, and the tare is weighed precisely. About 1.5 g of the magnetic body is then added to the sample cell through a funnel.

The sample cell containing the magnetic body is set in a VacuPrep 061 pre-processing device (Shimadzu Corp.) with an attached vacuum pump and nitrogen gas pipe, and vacuum degassed for about 10 hours continuously at 23° C. During vacuum degassing, degassing is performed gradually while adjusting the valve so that the magnetic body is not sucked up by the vacuum pump. The pressure inside the cell drops gradually as degassing progresses, becoming ultimately about 0.4 Pa (about 3 millitorr).

After completion of vacuum degassing, nitrogen gas is injected gradually to restore the sample cell to atmospheric pressure, and the sample cell is removed from the pre-processing device. The mass of this sample cell is weighed precisely, and the exact mass of the magnetic body is calculated from the difference between this and the tare weight. During this process, the sample cell is capped with a rubber stopper so that the magnetic body inside the sample cell is not contaminated by moisture or the like in the atmosphere.

Next, a dedicated "isothermal jacket" is attached to the stem of the sample cell containing the magnetic body. A dedicated filler rod is then inserted into the sample cell, and the sample cell is set in the analysis port of the previous device. The isothermal jacked is a cylindrical member composed of porous material on the inner surface and an impervious material on the outer surface so that liquid nitrogen can be pumped up to a certain level by capillary action.

Next, the free space of the sample cell including the connecting devices is measured. The free space is calculated by measuring the capacity of the sample cell with helium gas at 23° C., then using helium gas in the same way to measure the capacity of the sample cell after it has been cooled with liquid nitrogen, and calculating the free space from the difference between these two volumes. The saturated vapor pressure of nitrogen Po (Pa) is separately measured automatically using the Po tube built into the device.

Following vacuum degassing of the sample cell, vacuum degassing is continued as the sample cell is cooled with liquid nitrogen. Nitrogen gas is then introduced in stages into the sample cell to adsorb nitrogen molecules onto the magnetic body. During this process, the equilibrium pressure P (Pa) is measured over time to obtain the adsorption isotherm described above, and this adsorption isotherm is converted to a BET plot.

The points of relative pressure Pr for collecting data are set to 6 points: 0.05, 0.10, 0.15, 0.20, 0.25 and 0.30.

A straight line is drawn by the least square method with the resulting measurement data, and Vm is calculated from the slope and intercept of this straight line. This Vm value is also used to calculate the BET specific surface area of the magnetic body as described above.

Method for Measuring Volume Resistivity

About 1 g of toner (variable depending on the specific gravity of the sample) is compression molded for 60 seconds at 20 MPa with a tableting compression molder at 25° C., to obtain a disk 25 mm in diameter and 0.95 mm to 1.05 mm high.

A Solartron Co. 1260 frequency response analyzer (FRA) and a 1296 permittivity measurement interface from the same company are used as the impedance measurement unit.

Using SMaRT impedance measurement software from Solartron, impedance is measured automatically. Using SMaRT, complex impedance to a predetermined frequency f can be measured from the sinusoidal voltage of the frequency f and the response current to the sinusoidal voltage:

$$Z(\omega)=Re[Z(\omega)]+iIm[Z(\omega)]$$

in which Re [Z (ω)] is the real part of impedance, and iIm [Z (ω)] is the imaginary part of impedance. Furthermore, ω is the angular frequency, which is in the relationship of ω=2πf with the frequency f.

The measurement conditions are as follows.
Electrode area: 0.00031 m²
DC voltage: 0 V
AC voltage: 1 Vp-p
Charge: 10 N
ω: 100 Hz The volume resistivity (R, unit: Ω·cm) is determined by the following formula (7):

$$R=(Re[Z]^2+Im[Z]^2)\times S/(Re[Z]\times d) \quad (7)$$

in which Re [Z] is the actual part of impedance at 100 Hz, Im [Z] is the imaginary part of impedance at 100 Hz, d is the sample thickness (cm), and S is the electrode area (cm²).

X-Ray Photoelectron Spectroscopy (ESCA) Measurement Methods

The amounts of elements present on the surface of the magnetic body are calculated by surface composition analysis using ESCA.

The ESCA equipment and measurement conditions are as follows.
Device: Ulvac-Phi Inc. Quantum 2000
Analysis method: Narrow analysis
Measurement Conditions
X-ray source: Al-Kα
X-ray conditions: 100 μm, 25 W, 15 kV
Photoelectron uptake angle: 45°
Pass Energy: 58.70 eV Measurement range: φ 100 μm Measurement is performed under the above conditions, and the peak derived from C—C bonds in the carbon is orbital is corrected to 285 eV. The areas of peaks detected in the following ranges are then calculated.

Peak of SiO bonds in the silicon 2p orbital, for which peak top is detected at from 94 eV to 114 eV Peak of AlO bonds in the aluminum 2p orbital, for which peak top is detected at from 68 eV to 78 eV Peak of FeO bonds in the iron 2p orbital, for which peak top is detected at from 705 eV to 720 eV Peak of CO bonds in the carbon Is orbital, for which peak top is detected at from 278 eV to 298 eV Peak of O bonds in oxygen Is orbital for which peak top is detected at from 524 eV to 542 eV The atomic % of iron atoms (dFe), the atomic % of aluminum atoms (dAl) and the atomic % of silicon atoms (dSi) relative to the total amount of constituent elements are calculated from the respective peak areas using the relative sensitivity factors provided by Ulvac-Phi.

Method for Measuring Acid Value

The acid value is the number of mg of potassium hydroxide needed to neutralize the acid contained in 1 g of sample.

The acid value of the polymer A in the present invention is measured in accordance with JIS K 0070-1992, and the specific measurement procedures are as follows.

(1) Reagent Preparation

A phenolphthalein solution is obtained by dissolving 1.0 g of phenolphthalein in 90 mL of ethyl alcohol (95 vol %) and adding ion-exchanged water to a total of 100 mL.

7 g of special-grade potassium hydroxide is dissolved in 5 mL of water, and this is brought to 1 L by addition of ethyl alcohol (95 vol %). This is placed in an alkali-resistant container while avoiding contact with carbon dioxide and the like, allowed to stand for 3 days, and filtered to obtain a potassium hydroxide solution.

The resulting potassium hydroxide solution is stored in an alkali-resistant container. The factor of this potassium hydroxide solution is determined from the amount of the potassium hydroxide solution required for neutralization when 25 mL of 0.1 mol/L hydrochloric acid is introduced into an Erlenmeyer flask, several drops of the phenolphthalein solution are added, and titration is performed with the potassium hydroxide solution. The 0.1 mol/L hydrochloric acid is prepared in accordance with JIS K 8001-1998.

(2) Operations
(A) Main Test 2.0 g of a sample (for example, pulverized polymer A) is weighed exactly into a 200 mL Erlenmeyer flask, 100 mL of a toluene: ethanol (2:1) mixed solution is added, and the sample is dissolved over the course of 5 hours.

Several drops of the phenolphthalein solution are then added as an indicator, and titration is performed using the potassium hydroxide solution. The titration endpoint is taken to be persistence of the faint pink color of the indicator for 30 seconds.

(B) Blank Test

Titration is performed by the same operations as above, but without using any sample (that is, with only the toluene: ethanol (2:1) mixed solution).

(3) The acid value is calculated by substituting the obtained results into the following formula:

$$A = [(C-B) \times f \times 5.61]/S$$

where A is the acid value (mg KOH/g), B is the added amount (mL) of the potassium hydroxide solution in blank test, C is the added amount (mL) of the potassium hydroxide solution in main test, f is the factor of the potassium hydroxide solution, and S is the sample (g).

EXAMPLES

The present invention is explained in detail below using examples and comparative examples, but the invention is not limited thereto. Unless otherwise specified, parts in the formulations below are based on mass.

Preparation of Monomer Having Urethane Group 50.0 parts of methanol were loaded into a reactor, after which 5.0 parts of KarenzMOI [2-isocyanatoethyl methacrylate] (Showa Denko) were added dropwise at 40° C. under stirring. After completion of dropping, this was stirred for 2 hours with the temperature maintained at 40° C. The unreacted methanol was then removed in an evaporator to prepare a monomer having a urethane group.

Preparation of Monomer Having Urea Group 50.0 parts of dibutylamine were loaded into a reactor, after which 5.0 parts of KarenzMOI [2-isocyanatoethyl methacrylate] were added dropwise at room temperature under stirring. After completion of dropping, this was stirred for 2 hours. The unreacted dibutylamine was then removed in an evaporator to prepare a monomer having a urea group.

Manufacturing Example of Polymer A1

The following materials were added in a nitrogen atmosphere to a reactor equipped with a reflux condenser, a stirrer, a thermometer and a nitrogen introduction pipe.

| | |
|---|---|
| Toluene | 100.0 parts |
| Behenyl acrylate (first polymerizable monomer) | 67.0 parts |
| Methacrylonitrile (second polymerizable monomer) | 22.0 parts |
| Styrene (third polymerizable monomer) | 11.0 parts |
| t-butyl peroxypivalate (Perbutyl PV, NOF Corp.) | 3.0 parts |

The reactor contents were stirred at 200 rpm, heated to 70° C. and polymerized for 12 hours to obtain a solution of polymers of the monomer composition dissolved in toluene.

Next, this solution was cooled to 25° C., and added with stirring to 1,000.0 parts of methanol to precipitate a methanol-insoluble component.

The resulting methanol-insoluble component was filtered out, washed with methanol, and vacuum dried for 24 hours at 40° C. to obtain a polymer A1. The polymer A1 had a weight-average molecular weight of 20,100, an acid value of 0.0 mg KOH/g, and a melting point of 62° C.

NMR analysis of this polymer A1 showed that it contained 28.9 mol % monomer units derived from behenyl acrylate, 53.8 mol % monomer units derived from methacrylonitrile and 17.3 mol % monomer units derived from styrene.

Manufacturing Examples of Polymers A2 to A30

Polymers A2 to A30 were obtained as in the manufacturing example of the polymer A1 except that the monomer formulations were changed as shown in Table 1. The physical properties of the polymers A1 to A30 are shown in Table 2.

TABLE 1

| Polymer No. | First polymerizable monomer | | Second polymerizable monomer | | Third polymerizable monomer | |
|---|---|---|---|---|---|---|
| | Type | Parts by mass | Type | Parts by mass | Type | Parts by mass |
| A1 | Behenyl acrylate | 67.0 | Methacrylonitrile | 22.0 | Styrene | 11.0 |
| A2 | Behenyl acrylate | 40.0 | Methacrylonitrile | 40.0 | Styrene | 20.0 |
| A3 | Behenyl acrylate | 89.0 | Methacrylonitrile | 11.0 | — | — |
| A4 | Behenyl acrylate | 61.0 | Methacrylonitrile | 9.0 | Styrene | 30.0 |
| A5 | Behenyl acrylate | 40.0 | Methacrylonitrile | 60.0 | — | — |
| A6 | Behenyl acrylate | 34.0 | Methacrylonitrile | 11.0 | Styrene | 55.0 |
| A7 | Behenyl acrylate | 67.0 | Acrylonitrile | 22.0 | Styrene | 11.0 |
| A8 | Behenyl acrylate | 50.0 | 2-hydroxypropyl methacrylate | 40.0 | Styrene | 10.0 |
| A9 | Behenyl acrylate | 60.0 | Vinyl acetate | 30.0 | Styrene | 10.0 |
| A10 | Behenyl acrylate | 60.0 | Methyl acrylate | 30.0 | Styrene | 10.0 |

TABLE 1-continued

| Polymer No. | First polymerizable monomer Type | Parts by mass | Second polymerizable monomer Type | Parts by mass | Third polymerizable monomer Type | Parts by mass |
|---|---|---|---|---|---|---|
| A11 | Behenyl acrylate | 65.0 | Acrylamide | 25.0 | Styrene | 10.0 |
| A12 | Behenyl acrylate | 61.0 | Acrylic acid | 9.0 | Methyl methacrylate | 30.0 |
| A13 | Stearyl acrylate | 67.0 | Methacrylonitrile | 22.0 | Styrene | 11.0 |
| A14 | Myricyl acrylate | 67.0 | Methacrylonitrile | 22.0 | Styrene | 11.0 |
| A15 | Octacosyl acrylate | 67.0 | Methacrylonitrile | 22.0 | Styrene | 11.0 |
| A16 | Behenyl acrylate | 63.0 | Methacrylonitrile Acrylic acid | 7.0 7.0 | Styrene | 23.0 |
| A17 | Behenyl acrylate | 63.0 | Methacrylonitrile Acrylic acid | 15.0 7.0 | Styrene | 15.0 |
| A18 | Behenyl acrylate Stearyl acrylate | 47.0 20.0 | Methacrylonitrile | 22.0 | Styrene | 11.0 |
| A19 | Behenyl acrylate | 40.0 | Acrylonitrile Monomer having a urethane group | 27.5 2.5 | Styrene | 30.0 |
| A20 | Behenyl acrylate | 40.0 | Acrylonitrile Monomer having a urea group | 27.5 2.5 | Styrene | 30.0 |
| A21 | Behenyl acrylate Behenyl methacrylate | 33.0 34.0 | Methacrylonitrile | 22.0 | Styrene | 11.0 |
| A22 | Behenyl acrylate | 25.0 | Vinyl acetate | 75.0 | — | — |
| A23 | Behenyl acrylate | 66.6 | Acrylic acid | 4.8 | Methyl methacrylate | 28.6 |
| A24 | Behenyl acrylate | 20.0 | Methacrylonitrile | 53.0 | Styrene | 27.0 |
| A25 | Behenyl acrylate | 90.0 | Methacrylonitrile | 10.0 | — | — |
| A26 | Behenyl acrylate | 61.0 | Methacrylonitrile | 7.0 | Styrene | 32.0 |
| A27 | Behenyl acrylate | 20.0 | Methacrylonitrile | 80.0 | — | — |
| A28 | Behenyl acrylate | 15.0 | Methacrylonitrile | 10.0 | Styrene | 75.0 |
| A29 | Hexadecyl acrylate | 61.0 | Methacrylonitrile | 26.0 | Styrene | 13.0 |
| A30 | Behenyl acrylate | 60.0 | — | — | Methyl methacrylate Styrene | 29.0 11.0 |

TABLE 2

| Polymer No. | First polymerizable monomer Monomer units (mol %) | Second polymerizable monomer Monomer units (mol %) | Third polymerizable monomer Monomer units (mol %) | $SP_{21}-SP_{11}$ $(J/cm^3)^{0.5}$ | $SP_{22}-SP_{12}$ | Melting point °C. | Weight-average molecular weight |
|---|---|---|---|---|---|---|---|
| A1 | 28.9 | 53.8 | 17.3 | 7.71 | 4.28 | 62 | 20100 |
| A2 | 11.8 | 66.7 | 21.5 | 7.71 | 4.28 | 55 | 18500 |
| A3 | 58.8 | 41.2 | — | 7.71 | 4.28 | 62 | 19400 |
| A4 | 27.5 | 23.0 | 49.5 | 7.71 | 4.28 | 57 | 19000 |
| A5 | 10.5 | 89.5 | — | 7.71 | 4.28 | 56 | 19600 |
| A6 | 11.4 | 21.0 | 67.6 | 7.71 | 4.28 | 53 | 19000 |
| A7 | 25.3 | 59.5 | 15.2 | 11.19 | 5.05 | 62 | 19700 |
| A8 | 26.0 | 55.0 | 19.0 | 5.87 | 4.36 | 59 | 19900 |
| A9 | 26.2 | 57.9 | 15.9 | 3.35 | 0.61 | 56 | 19000 |
| A10 | 26.2 | 57.9 | 15.9 | 3.35 | 0.61 | 54 | 19500 |
| A11 | 27.6 | 56.9 | 15.5 | 21.01 | 11.43 | 59 | 18800 |
| A12 | 27.4 | 21.4 | 51.2 | 10.47 | 4.97 | 57 | 18500 |
| A13 | 32.3 | 51.2 | 16.5 | 7.57 | 4.25 | 54 | 19500 |
| A14 | 23.9 | 57.6 | 18.5 | 7.88 | 4.32 | 76 | 18500 |
| A15 | 25.0 | 56.8 | 18.2 | 7.85 | 4.32 | 78 | 19000 |
| A16 | 28.2 | 17.7 16.5 | 37.6 | 7.71 10.47 | 4.28 4.97 | 58 | 19900 |
| A17 | 26.3 | 35.5 15.4 | 22.8 | 7.71 10.47 | 4.28 4.97 | 61 | 19000 |
| A18 | 20.0 10.0 | 53.0 | 17.0 | 7.67 | 4.27 | 58 | 19400 |
| A19 | 11.4 | 56.0 1.4 | 31.2 | 11.19 5.54 | 5.05 4.21 | 55 | 18800 |
| A20 | 11.4 | 56.3 1.0 | 31.3 | 11.19 3.50 | 5.05 3.17 | 55 | 20000 |
| A21 | 14.3 14.2 | 54.1 | 17.4 | 7.79 | 4.32 | 62 | 20100 |
| A22 | 7 | 93 | — | 3.35 | 0.61 | 59 | 19200 |

TABLE 2-continued

| Polymer No. | First polymerizable monomer Monomer units (mol %) | Second polymerizable monomer Monomer units (mol %) | Third polymerizable monomer Monomer units (mol %) | $SP_{21}$-$SP_{11}$ $(J/cm^3)^{0.5}$ | $SP_{22}$-$SP_{12}$ | Melting point ° C. | Weight-average molecular weight |
|---|---|---|---|---|---|---|---|
| A23 | 33.2 | 12.6 | 54.2 | 10.47 | 4.97 | 56 | 21200 |
| A24 | 4.8 | 71.7 | 23.5 | 7.71 | 4.28 | 55 | 21900 |
| A25 | 61.3 | 38.7 | — | 7.71 | 4.28 | 62 | 22400 |
| A26 | 28.0 | 18.2 | 53.8 | 7.71 | 4.28 | 56 | 20600 |
| A27 | 4.2 | 95.8 | — | 7.71 | 4.28 | 55 | 21500 |
| A28 | 4.3 | 16.4 | 79.3 | 7.71 | 4.28 | 51 | 21200 |
| A29 | 28.6 | 54.0 | 17.4 | 7.49 | 4.23 | 45 | 22200 |
| A30 | 28.5 | — | 52.4 19.1 | — | — | 52 | 21300 |

Manufacturing Example of Polymer B1

| | |
|---|---|
| Bisphenol A propylene oxide (2.0 mol) adduct | 10.0 parts |
| Bisphenol A ethylene oxide (2.0 mol) adduct | 10.0 parts |
| Ethylene glycol | 20.0 parts |
| Terephthalic acid | 15.0 parts |
| Succinic acid | 38.0 parts |
| Trimellitic acid | 7.0 parts |

This polyester monomer mixture was loaded into a 5-liter autoclave, and 0.05 mass % of tetraisobutyl titanate was added relative to the total amount of the polyester monomer mixture. A reflux condenser, moisture separator, nitrogen gas introduction pipe, thermometer and stirrer were attached, and nitrogen gas was introduced into the autoclave as a polycondensation reaction was performed at 230° C. The reaction time was adjusted so as to obtain the weight-average molecular weight shown in Table 4. After completion of the reaction the contents were removed from the vessel, cooled, and pulverized to obtain a polymer B1. The resulting polymer B1 had an acid value of 9.6 mg KOH/g.

Manufacturing Examples of Polymer B2 to B4

Polymers B2 to B4 were obtained as in the manufacturing example of the polymer B1 except that the monomer formulations were changed as shown in Table 3. The physical properties of the polymers B1 to B4 are shown in Table 4.

TABLE 3

| | Polymer B | B1 | B2 | B3 | B4 |
|---|---|---|---|---|---|
| Alcohols | Bisphenol A propylene oxide 2.0 mol adduct | 10 | 15 | 15 | 25 |
| | Bisphenol A ethylene oxide 2.0 mol adduct | 10 | 15 | 10 | 35 |
| | Ethylene glycol | 20 | 20 | 10 | |
| Acids | Terephthalic acid | 15 | 30 | 20 | 10 |
| | Sebacic acid | | | | 30 |
| | Succinic acid | 38 | 20 | 36 | |
| | Trimellitic acid | 7 | | 9 | |
| | Total | 100 | 100 | 100 | 100 |

TABLE 4

| | Polymer B | B1 | B2 | B3 | B4 |
|---|---|---|---|---|---|
| Physical properties | Weight-average molecular weight | 32000 | 50000 | 28000 | 35000 |
| | Acid value (mg KOH/g) | 9.6 | 2.1 | 21.3 | 10.1 |
| | SP(B) | 24.0 | 23.8 | 23.2 | 19.0 |
| | $SP_{21}$ − SP(B) | 2.0 | 2.2 | 2.8 | 7.0 |

Manufacturing Example of Magnetic Body C1

(1) Manufacturing Magnetic Core Particle

92 L of a ferrous sulfate aqueous solution with a $Fe^{2+}$ concentration of 1.79 mol/L and 88 L of a 3.74 mol/L sodium hydroxide aqueous solution were added, mixed and stirred. The pH of this solution was 6.5.

This solution was maintained at 89° C., pH 9 to 12 as air was blown in at a rate of 20 L/min to cause an oxidation reaction and produce a core particle. Once the ferrous hydroxide had been completely consumed, air blowing was stopped to terminate the oxidation reaction. The resulting magnetic core particle consisted of magnetite with an octahedral shape.

(2) Forming Coat Layer 2.50 L of 0.70 mol/L sodium silicate aqueous solution and 2.00 L of 0.90 mol/L ferrous sulfate aqueous solution were mixed, water was added to bring the aqueous solution to 5.00 L, and the pH maintained at 7 to 9 as this was added to the slurry from the previous reaction containing 13,500 g of magnetic core particles. Air was then blown in at 10 L/min until no $Fe^{2+}$ remained in the slurry.

Next, 0.70 L of 1.50 mol/L aluminum sulfate aqueous solution and 2.00 L of 0.90 mol/L ferrous sulfate aqueous solution were mixed, water was added to bring the aqueous solution to 5.00 L, and, while maintaining the pH at 7 to 9, this was added to the slurry from the previous reaction containing magnetic core particles with.

Air was then blown in at 10 L/min until no $Fe^{2+}$ remained in the slurry.

The temperature of the slurry was maintained at 89° C. After being mixed and stirred for 30 minutes the slurry was filtered, washed, and dried to obtain a magnetic body C1.

The magnetic body C1 was octahedral in shape, and had a number-average particle diameter (D1) of 120 nm. Its oil absorption was 25 ml/100 g. The physical properties of the resulting magnetic body C1 are shown in Table 5.

Manufacturing Examples of Magnetic Bodies C2 to C9

Magnetic core particles were obtained as in the manufacturing example of the magnetic body C1 except that the manufacturing conditions of the magnetic core particles were adjusted appropriately so that the number-average particle diameters and shapes of the resulting magnetic bodies were as shown in Table 5.

The adjusted manufacturing conditions were the concentration and added amount of each solution, the temperature and pH during the oxidation reaction, and the rate and amount of the blow-in air.

Coat layers were then formed under the conditions shown in Table 6 to obtain Magnetic Bodies C2 to C9. The physical properties are shown in Table 5.

In the table, "Conc." denotes "Concentration".

Manufacturing Example of Toner 1

Manufacture of Toner by Pulverization

| | |
|---|---|
| Polymer A1 | 80.0 parts |
| Polymer B1 | 20.0 parts |
| Magnetic body C1 | 60.0 parts |
| Wax (Fischer-Tropsch wax C105, Sasol) | 4.0 parts |
| Charge control agent | 2.0 parts |

(T-77: Hodogaya Chemical Co.)

These materials were pre-mixed in an FM mixer (Nippon Coke & Engineering), and then melt kneaded with a twin-screw kneading extruder (Ikegai Iron Works PCM-30).

The resulting kneaded product was cooled, coarsely pulverized in a hammer mill, and then pulverized in a mechanical pulverizer (Turbo Kogyo T-250), and the resulting finely pulverized powder was classified with a multi-division classifier using the Coanda effect to obtain a toner particle 1 with a weight-average particle diameter (D4) of 8.0 μm.

Using an FM mixer (Nippon Coke & Engineering FM-75), 1.2 parts of a hydrophobically treated silica fine particle [BET specific surface area 150 m²/g, obtained by hydrophobically treating 100 parts of a silica fine particle with 30 parts if hexamethyldisilazane (HIDS) and 10 parts of dimethyl silicone oil] were added externally and mixed with 100 parts of the toner particle, which was then sieved through a 150 jam mesh to obtain a toner 1.

In AC impedance measurement, the volume resistivity of the toner 1 was calculated to be $2.5 \times 10^{12}$ Ω·cm.

Manufacturing Examples of Toners 2 to 32 and 40 to 47

Toners 2 to 32 and 40 to 47 were obtained as in the manufacturing example of the toner 1 except that the formulations were changed as shown in Table 7. The volume resistivity of each toner is shown in Table 8.

TABLE 5

| Magnetic body No. | Number-average particle diameter nm | Shape | BET specific surface area m²/g | Oil absorption ml/100 g | ESCA analysis dSi/dFe | ESCA analysis dAl/dFe |
|---|---|---|---|---|---|---|
| C1 | 120 | Octahedral | 12.1 | 25 | 0.43 | 0.15 |
| C2 | 150 | Octahedral | 9.2 | 34 | 1.50 | 0.90 |
| C3 | 100 | Octahedral | 14.8 | 13 | 0.15 | 0.06 |
| C4 | 120 | Spherical | 11.8 | 27 | 0.46 | 0.19 |
| C5 | 120 | Spherical | 11.8 | 18 | 0.00 | 0.61 |
| C6 | 120 | Spherical | 11.8 | 37 | 0.00 | 1.95 |
| C7 | 120 | Spherical | 11.8 | 9 | 0.00 | 0.12 |
| C8 | 200 | Spherical | 8.0 | 4 | 0.00 | 0.00 |
| C9 | 120 | Spherical | 11.8 | 41 | 2.50 | 1.50 |

TABLE 6

Coat layer forming reaction conditions

| | Type and amount of added metal salt | | | | | | | | |
|---|---|---|---|---|---|---|---|---|---|
| | (a) | | | | (b) | | | | |
| | Sodium silicate | | Ferrous sulfate | | Aluminum sulfate | | Ferrous sulfate | | |
| Magnetic body No. | Conc. mol/L | Liquid amount L | Conc. mol/L | Liquid amount L | Conc. mol/L | Liquid amount L | Conc. mol/L | Liquid amount L | Coat layer forming pH | Temperature °C |
| C1 | 0.70 | 2.50 | 0.90 | 2.00 | 1.50 | 0.70 | 0.90 | 2.00 | 7-9 | 89 |
| C2 | 0.70 | 7.00 | 0.90 | 2.00 | 1.50 | 1.80 | 0.90 | 2.00 | 7-9 | 89 |
| C3 | 0.70 | 1.00 | 0.90 | 2.00 | 1.50 | 0.20 | 0.90 | 2.00 | 7-9 | 89 |
| C4 | 0.70 | 2.50 | 0.90 | 2.00 | 1.50 | 0.70 | 0.90 | 2.00 | 7-9 | 89 |
| C5 | — | — | — | — | 1.50 | 0.70 | 0.90 | 2.00 | 7-9 | 89 |
| C6 | — | — | — | — | 1.50 | 2.10 | 0.90 | 2.00 | 7-9 | 89 |
| C7 | — | — | — | — | 1.50 | 0.15 | 0.90 | 2.00 | 7-9 | 89 |
| C8 | No treatment | | | | | | | | | |
| C9 | 0.70 | 12.00 | 0.90 | 2.00 | 1.50 | 3.00 | 0.90 | 2.00 | 7-9 | 89 |

TABLE 7

| Toner No. | Polymer A Type | Polymer A Parts by mass | Polymer B Type | Polymer B Parts by mass | Magnetic body C Type | Magnetic body C Parts by mass | Wax Type | Wax Parts by mass | Charge control agent Type | Charge control agent Parts by mass |
|---|---|---|---|---|---|---|---|---|---|---|
| 1 | A1 | 80.0 | B1 | 20.0 | C1 | 60.0 | C105 | 4.0 | T77 | 2.0 |
| 2 | A1 | 65.0 | B1 | 35.0 | C1 | 60.0 | C105 | 4.0 | T77 | 2.0 |
| 3 | A1 | 95.0 | B1 | 5.0 | C1 | 60.0 | C105 | 4.0 | T77 | 2.0 |
| 4 | A1 | 80.0 | B2 | 20.0 | C1 | 60.0 | C105 | 4.0 | T77 | 2.0 |
| 5 | A1 | 80.0 | B3 | 20.0 | C1 | 60.0 | C105 | 4.0 | T77 | 2.0 |
| 6 | A1 | 80.0 | B4 | 20.0 | C1 | 60.0 | C105 | 4.0 | T77 | 2.0 |
| 7 | A1 | 100.0 | — | — | C1 | 60.0 | C105 | 4.0 | T77 | 2.0 |
| 8 | A2 | 100.0 | — | — | C1 | 60.0 | C105 | 4.0 | T77 | 2.0 |
| 9 | A3 | 100.0 | — | — | C1 | 60.0 | C105 | 4.0 | T77 | 2.0 |
| 10 | A4 | 100.0 | — | — | C1 | 60.0 | C105 | 4.0 | T77 | 2.0 |
| 11 | A5 | 100.0 | — | — | C1 | 60.0 | C105 | 4.0 | T77 | 2.0 |
| 12 | A6 | 100.0 | — | — | C1 | 60.0 | C105 | 4.0 | T77 | 2.0 |
| 13 | A7 | 100.0 | — | — | C1 | 60.0 | C105 | 4.0 | T77 | 2.0 |
| 14 | A8 | 100.0 | — | — | C1 | 60.0 | C105 | 4.0 | T77 | 2.0 |
| 15 | A9 | 100.0 | — | — | C1 | 60.0 | C105 | 4.0 | T77 | 2.0 |
| 16 | A10 | 100.0 | — | — | C1 | 60.0 | C105 | 4.0 | T77 | 2.0 |
| 17 | A11 | 100.0 | — | — | C1 | 60.0 | C105 | 4.0 | T77 | 2.0 |
| 18 | A12 | 100.0 | — | — | C1 | 60.0 | C105 | 4.0 | T77 | 2.0 |
| 19 | A13 | 100.0 | — | — | C1 | 60.0 | C105 | 4.0 | T77 | 2.0 |
| 20 | A14 | 100.0 | — | — | C1 | 60.0 | C105 | 4.0 | T77 | 2.0 |
| 21 | A15 | 100.0 | — | — | C1 | 60.0 | C105 | 4.0 | T77 | 2.0 |
| 22 | A16 | 100.0 | — | — | C1 | 60.0 | C105 | 4.0 | T77 | 2.0 |
| 23 | A17 | 100.0 | — | — | C1 | 60.0 | C105 | 4.0 | T77 | 2.0 |
| 24 | A18 | 100.0 | — | — | C1 | 60.0 | C105 | 4.0 | T77 | 2.0 |
| 25 | A19 | 100.0 | — | — | C1 | 60.0 | C105 | 4.0 | T77 | 2.0 |
| 26 | A20 | 100.0 | — | — | C1 | 60.0 | C105 | 4.0 | T77 | 2.0 |
| 27 | A21 | 100.0 | — | — | C1 | 60.0 | C105 | 4.0 | T77 | 2.0 |
| 28 | A22 | 100.0 | — | — | C1 | 60.0 | C105 | 4.0 | T77 | 2.0 |
| 29 | A1 | 100.0 | — | — | C2 | 60.0 | C105 | 4.0 | T77 | 2.0 |
| 30 | A1 | 100.0 | — | — | C3 | 60.0 | C105 | 4.0 | T77 | 2.0 |
| 31 | A1 | 100.0 | — | — | C1 | 95.0 | C105 | 4.0 | T77 | 2.0 |
| 32 | A1 | 100.0 | — | — | C1 | 35.0 | C105 | 4.0 | T77 | 2.0 |
| 34 | A1 | 100.0 | — | — | C4 | 60.0 | C105 | 4.0 | — | — |
| 35 | A1 | 100.0 | — | — | C5 | 60.0 | C105 | 4.0 | — | — |
| 36 | A1 | 100.0 | — | — | C5 | 20.0 | C105 | 4.0 | — | — |
| 37 | A1 | 100.0 | — | — | C5 | 120.0 | C105 | 4.0 | — | — |
| 38 | A1 | 100.0 | — | — | C6 | 60.0 | C105 | 4.0 | — | — |
| 39 | A1 | 100.0 | — | — | C7 | 60.0 | C105 | 4.0 | — | — |
| 40 | A23 | 100.0 | — | — | C1 | 60.0 | C105 | 4.0 | T77 | 2.0 |
| 41 | A24 | 100.0 | — | — | C1 | 60.0 | C105 | 4.0 | T77 | 2.0 |
| 42 | A25 | 100.0 | — | — | C1 | 60.0 | C105 | 4.0 | T77 | 2.0 |
| 43 | A26 | 100.0 | — | — | C1 | 60.0 | C105 | 4.0 | T77 | 2.0 |
| 44 | A27 | 100.0 | — | — | C1 | 60.0 | C105 | 4.0 | T77 | 2.0 |
| 45 | A28 | 100.0 | — | — | C1 | 60.0 | C105 | 4.0 | T77 | 2.0 |
| 46 | A29 | 100.0 | — | — | C1 | 60.0 | C105 | 4.0 | T77 | 2.0 |
| 47 | A30 | 100.0 | — | — | C1 | 60.0 | C105 | 4.0 | T77 | 2.0 |
| 48 | A1 | 100.0 | — | — | C8 | 95.0 | C105 | 4.0 | — | — |
| 49 | A1 | 100.0 | — | — | C9 | 95.0 | C105 | 4.0 | — | — |

TABLE 8

| Toner No. | Volume resistivity $\Omega \cdot cm$ |
|---|---|
| 1 | $2.5 \times 10^{13}$ |
| 2 | $6.2 \times 10^{13}$ |
| 3 | $8.9 \times 10^{12}$ |
| 4 | $1.0 \times 10^{13}$ |
| 5 | $3.8 \times 10^{13}$ |
| 6 | $7.7 \times 10^{12}$ |
| 7 | $5.3 \times 10^{12}$ |
| 8 | $7.8 \times 10^{12}$ |
| 9 | $2.0 \times 10^{11}$ |
| 10 | $2.9 \times 10^{11}$ |
| 11 | $5.6 \times 10^{12}$ |
| 12 | $8.0 \times 10^{11}$ |
| 13 | $6.7 \times 10^{12}$ |
| 14 | $4.2 \times 10^{12}$ |
| 15 | $1.2 \times 10^{12}$ |
| 16 | $7.4 \times 10^{12}$ |
| 17 | $7.3 \times 10^{12}$ |
| 18 | $6.1 \times 10^{12}$ |
| 19 | $3.8 \times 10^{12}$ |
| 20 | $7.0 \times 10^{12}$ |
| 21 | $7.2 \times 10^{12}$ |
| 22 | $3.0 \times 10^{12}$ |
| 23 | $4.5 \times 10^{12}$ |
| 24 | $5.1 \times 10^{12}$ |
| 25 | $2.2 \times 10^{12}$ |
| 26 | $1.5 \times 10^{12}$ |
| 27 | $4.8 \times 10^{12}$ |
| 28 | $6.5 \times 10^{12}$ |
| 29 | $7.2 \times 10^{12}$ |
| 30 | $8.5 \times 10^{12}$ |
| 31 | $2.0 \times 10^{11}$ |
| 32 | $1.3 \times 10^{13}$ |
| 33 | $6.0 \times 10^{12}$ |
| 34 | $6.6 \times 10^{12}$ |

TABLE 8-continued

| Toner No. | Volume resistivity Ω · cm |
|---|---|
| 35 | $7.5 \times 10^{12}$ |
| 36 | $8.5 \times 10^{13}$ |
| 37 | $9.1 \times 10^{10}$ |
| 38 | $9.1 \times 10^{12}$ |
| 39 | $5.4 \times 10^{11}$ |
| 40 | $8.0 \times 10^{10}$ |
| 41 | $3.5 \times 10^{12}$ |
| 42 | $7.5 \times 10^{10}$ |
| 43 | $8.5 \times 10^{10}$ |
| 44 | $5.6 \times 10^{12}$ |
| 45 | $3.9 \times 10^{11}$ |
| 46 | $1.3 \times 10^{12}$ |
| 47 | $9.6 \times 10^{9}$ |
| 48 | $8.9 \times 10^{10}$ |
| 49 | $7.8 \times 10^{11}$ |

Manufacturing Example of Toner 33

Manufacture of Toner by Emulsion Aggregation
Preparation of Polymer Dispersion

| Toluene | 300.0 parts |
|---|---|
| Polymer A1 | 100.0 parts |

These materials were weighed precisely, mixed, and dissolved at 90° C.

5.0 parts of sodium dodecylbenzene sulfonate and 10.0 parts of sodium laurate were added separately to 700.0 parts of ion-exchanged water, and heated to dissolve at 90° C.

Next, the toluene solution and aqueous solution were mixed together, and stirred at 7,000 rpm with a T. K. Robomix ultra high-speed mixer (Primix).

This was further emulsified under 200 MPa of pressure with a Nanomizer high-pressure impact disperser (Yoshida Kikai). The toluene was then removed with an evaporator, and the concentration was adjusted with ion-exchanged water to obtain a polymer dispersion with a polymer fine particle concentration of 20 mass %.

Preparation of Wax Dispersion

| Wax (Fischer-Tropsch wax C105, Sasol) | 100.0 parts |
|---|---|
| Anionic surfactant Neogen RK (Daiichi Kogyo) | 5.0 parts |
| Ion-exchanged water | 395.0 parts |

These materials were weighed precisely, loaded into a mixing vessel with an attached stirring device, heated to 90° C., and then dispersed for 60 minutes by recirculating into a Clearmix W-Motion (M Technique). The dispersion conditions were as follows.

| Outer rotor diameter | 3 cm |
|---|---|
| Clearance | 0.3 mm |
| Rotor speed | 19,000 r/min |
| Screen rotation | 19,000 r/min |

After being dispersed, this was cooled to 40° C. under conditions of rotor speed 1,000 r/min, screen rotation 0 r/min, cooling speed 10° C./min to obtain a wax dispersion having a concentration of 20 mass % of the wax fine particle.

Preparation of Magnetic Body Dispersion

| Magnetic body C1 | 50.0 parts |
|---|---|
| Ion-exchanged water | 450.0 parts |

These materials were weighed precisely, mixed, and dispersed for about 1 hour with a Nanomizer high-pressure impact disperser (Yoshida Kikai) to obtain a magnetic body dispersion with a concentration of 10 mass % of the magnetic body fine particle.

Manufacture of Toner

| Polymer dispersion | 400.0 parts |
|---|---|
| Wax dispersion | 16.0 parts |
| Magnetic body dispersion | 480.0 parts |
| Ion-exchanged water | 100.0 parts |

These materials were placed in a round-bottom stainless steel flask, and mixed.

This was then dispersed for 10 minutes at 5,000 r/min with an Ultra Turrax T50 homogenizer (IKA). 1.0% aqueous nitric acid solution was added to adjust the pH to 3.0, after which the mixture was heated to 58° C. in a heating water bath using a stirring blade while adjusting number of rotations appropriately so that the mixture could be stirred.

The volume-average particle diameter of the resulting aggregated particles was checked appropriately with a Coulter Multisizer III, and once aggregated particles with a volume-average particle diameter of 6.0 μm had formed, the pH was adjusted to 9.0 with a 5% sodium hydroxide aqueous solution.

This was then heated to 75° C. with continued stirring, and maintained at 75° C. for 1 hour to fuse the aggregated particles.

This was then cooled to 50° C., and maintained for 3 hours to promote crystallization of the polymer.

This was then cooled to 25° C., subjected to filtration and solid-liquid separation, and washed with ion-exchanged water.

After completion of washing, this was dried with a vacuum drier to obtain a toner particle with a weight-average particle diameter (D4) of 6.1 μm.

Using an FM mixer (Nippon Coke & Engineering FM-75), 1.2 parts of a hydrophobically treated silica fine particle [BET specific surface area 150 m²/g, obtained by hydrophobically treating 100 parts of a silica fine particle with 30 parts if hexamethyldisilazane (FIDS) and 10 parts of dimethyl silicone oil] were added externally and mixed with 100 parts of the toner particle, which was then sieved through a 150 μm mesh to obtain a toner 33.

In AC impedance measurement, the volume resistivity of the toner 33 was calculated to be $6.0 \times 10^{12}$ Ω·cm.

Manufacturing Example of Toner 34

Manufacture of Toner by Suspension Polymerization
Manufacture of Toner Particle

| Monomer composition (The monomer composition is a mixture of the following behenyl acrylate, methacrylonitrile and styrene in the following proportions.) | 100.0 parts |
|---|---|
| Behenyl acrylate (first polymerizable monomer) | 67.0 parts (28.9 mol %) |

| | |
|---|---|
| Methacrylonitrile (second polymerizable monomer) | 22.0 parts (53.8 mol %) |
| Styrene (third polymerizable monomer) | 11.0 parts (17.3 mol %) |
| Magnetic body C4 | 60.0 parts |
| Wax (Fischer-Tropsch wax C105, Sasol) | 4.0 parts |
| Toluene | 100.0 parts |

A mixture of the above components was prepared, loaded into an attritor (Nippon Coke & Engineering), and dispersed for 2 hours at 200 rpm with zirconia beads 5 mm in diameter to obtain a raw material dispersion.

Meanwhile, 735.0 parts of ion-exchanged water and 16.0 parts of trisodium phosphate (12-hydrate) were added to a vessel provided with a Homomixer high-speed agitator (Primix) and a thermometer, and stirred at 12,000 rpm as the temperature was raised to 60° C.

A calcium chloride aqueous solution of 9.0 parts of calcium chloride (2-hydrate) dissolved in 65.0 parts of ion-exchanged water was added, and stirred for 30 minutes at 12,000 rpm with the temperature maintained at 60° C. 10% hydrochloric acid was added to adjust the pH to 6.0 and obtain an aqueous medium containing a dispersion stabilizer.

Next, the above raw material dispersion was transferred to a vessel equipped with a stirring device and a thermometer, and stirred at 100 rpm as the temperature was raised to 60° C. 8.0 parts of t-butyl peroxypivalate (NOF: Perbutyl PV) were then added as a polymerization initiator, and stirred for 5 minutes at 100 rpm with the temperature maintained at 60° C., after which the mixture was added to the aqueous medium as the medium was stirred at 12,000 rpm with the high-speed agitator. The temperature was then maintained at 60° C. as stirring was continued for 20 minutes at 12,000 rpm with the high-speed agitator to obtain a granulating liquid.

This granulating liquid was transferred to a reactor equipped with a reflux condenser, a stirrer, a thermometer and a nitrogen introduction pipe, and stirred at 150 rpm in a nitrogen atmosphere as the temperature was raised to 70° C. A polymerization reaction was then performed for 10 hours at 150 rpm with the temperature maintained at 70° C. The reflux condenser was then removed from the reactor, the temperature of the reaction solution was raised to 95° C., and the solution was stirred for 5 hours at 150 rpm with the temperature maintained at 95° C. to remove the toluene and obtain a toner particle dispersion.

The resulting toner particle dispersion was cooled to 20° C. while being stirred at 150 rpm, after which stirring was maintained as dilute hydrochloric acid was added to bring the pH to 1.5 and dissolve the dispersion stabilizer.

The solids were filtered out, and after thorough washing with ion-exchanged water, this was vacuum dried for 24 hours at 40° C. to obtain a toner particle.

Using an FM mixer (Nippon Coke & Engineering FM-75), 1.2 parts of a hydrophobically treated silica fine particle [BET specific surface area 150 m$^2$/g, obtained by hydrophobically treating 100 parts of a silica fine particle with 30 parts if hexamethyldisilazane (HMDS) and 10 parts of dimethyl silicone oil] were added externally and mixed with 100 parts of the toner particle, which was then sieved through a 150 μm mesh to obtain a toner 34.

In AC impedance measurement, the volume resistivity of the toner 34 was calculated to be 6.6×10$^{12}$ 2 Ω·cm.

Manufacturing Examples of Toner 35 to 39, 48 and 49

Toners 35 to 39, 48 and 49 were obtained as in the manufacturing example of the toner 34 except that the formulations were changed as shown in Table 7. The volume resistivity of each toner is shown in Table 8.

Example 1

The toner 1 was evaluated as follows. The evaluation results are shown in Table 9.

The process speed of an HP LaserJet Enterprise M609dn was modified to 410 mm/sec for use in the evaluation.

The fixing unit of this evaluation device was taken out, and modified so that the temperature could be set at will and the process speed was 410 mm/sec to obtain an external fixing unit.

The evaluation paper was Vitality (Xerox, basis weight 75 g/cm$^2$, letter size).

Examples 2 to 39

The same evaluations were performed as in Example 1 using the toners 2 to 39. The evaluation results are shown in Table 9.

Comparative Examples 1 to 10

The same evaluations were performed as in Example 1 using the toners 40 to 49. The evaluation results are shown in Table 9.

Evaluation of Low-Temperature Fixability

Using the above device in an environment of 23° C., 60% RH, a solid black unfixed image with a toner laid-on level of 0.5 mg/cm$^2$ per unit area was passed through the fixing unit, which had been adjusted to a set temperature.

The resulting fixed image was rubbed five times back and forth with Silbon paper under a load of 4.9 kPa (50 g/cm$^2$), and the temperature at which the density decrease after the rubbing test was 10% or less was given as the fixing temperature.

Evaluation Standard
A: Fixing temperature less than 120° C.
B: Fixing temperature from 120° C. to less than 130° C.
C: Fixing temperature from 130° C. to less than 140° C.
D: Fixing temperature at least 140° C.

Evaluation of Fogging

Using the above device, a total of 10,000 prints of a horizontal line pattern with a print percentage of 1% were output 2 prints per job in a low-temperature, low-humidity environment (15° C., 10% RH), with the mode set so that the machine would stop between job and job before starting the next job.

After 10,000 prints a solid white image was output, and fogging was evaluated according to the following standard.

Measurement was performed using a Model TC-6DS Reflectometer (Tokyo Denshoku), the worst value of white background reflection density after image formation was given as Ds and the average reflection density of the evaluation paper before image formation as Dr, and fogging was evaluated using Dr−Ds as the amount of fogging.

Consequently, a smaller value indicates that fogging has been suppressed.

Evaluation Standard
A: Fogging less than 1.0
B: Fogging from 1.0 to less than 2.0

C: Fogging from 2.0 to less than 3.0
D: Fogging from 3.0 to less than 4.0
E: Fogging at least 4.0

Evaluation of Trailing

A cartridge filled with the toner was tapped 300 times, and left for 30 days in a severe environment (40° C., 95% RH). It was then left for 1 day in a low-temperature, low-humidity environment (15° C., 10% RH).

A total of 20,000 prints of a horizontal line pattern with a print percentage of 2% were then output 2 prints per job, with the mode set so that the machine would stop between job and job before starting the next job.

One print of an image consisting of a 600 dpi, 8-dot vertical and horizontal line pattern latent image (the line width of the electrostatic latent image is 420 µm) drawn at intervals of 1 cm on the surface of an electrophotographic photoreceptor by laser exposure was then printed out on a PET OHP, and used as a trailing image.

The line width of the printed out line image was measured. Trailing was evaluated by using a Kosaka Laboratory surface roughness tester (trade name: Surfcoder SE-30H) to obtain a surface roughness profile representing the laid-on condition of the toner in the vertical and horizontal lines of the resulting vertical and horizontal line pattern image. The line widths were determined from the widths of this profile, and the vertical/horizontal line ratio was calculated. Because trailing occurs in the direction of rotation of the electrostatic latent image bearing member, the width of the horizontal lines is greater because they are more affected by trailing than the vertical lines. This causes the vertical/horizontal line ratio to be 1 or less, so a value close to 1 is thought to indicate that trailing has been suppressed.

Evaluation Standard
A: Vertical/horizontal line ratio from 0.95 to 1.00
B: Vertical/horizontal line ratio from 0.90 to less than 0.95
C: Vertical/horizontal line ratio from 0.80 to less than 0.90
D: Vertical/horizontal line ratio from 0.70 to less than 0.80
E: Vertical/horizontal line ratio less than 0.70

Evaluation of Heat-Resistant Storage Stability

Heat-resistant storage stability was evaluated to evaluate stability during storage.

About 5 g of toner was placed in a 100 mL polypropylene cup, and left for 10 days in an environment of 50° C., 20% RH, after which the degree of aggregation of the toner was measured as follows and evaluated according to the following standard.

For the measurement unit, a digital display vibration meter Digivibro Model 1332A (Showa Sokki) was connected to the shaking table side part of a Powder Tester (Hosokawa Micron).

A 38 µm (400 mesh) screen, a 75 µm (200 mesh) screen and a 150 µm (100 mesh) screen were then set on the Powder Tester shaking table in that order from bottom to top. Measurement was performed as follows at 23° C., 60% RH.

(1) The vibration width of the shaking table was adjusted in advance so that the displacement value of the digital display vibration meter was 0.60 mm (peak-to-peak).

(2) Toner that had been left for 10 days as described above was left for 24 hours in advance in a 23° C., 60% RH environment, and 5 g of this toner was weighed exactly and placed gently on the upper 150 µm screen.

(3) The screens were vibrated for 15 seconds, the mass of the toner remaining on each screen was measured, and aggregation was calculated based on the following formula. The evaluation results are shown in Table 9.

Aggregation (%)={(sample mass(g) on 150 µm screen)/5(g)}×100+{(sample mass(g) on 75 µm screen)/5(g)}×100×0.6+{(sample mass(g) on 38 µm screen)/5(g)}×100×0.2

The evaluation standard is as follows.
A: Aggregation less than 20%
B: Aggregation from 20% to less than 25%
C: Aggregation from 25% to less than 30%
D: Aggregation at least 30%

TABLE 9

| | Toner No. | Low-temperature fixability | | Fogging | | Trailing | | Heat-resistant storage stability | |
|---|---|---|---|---|---|---|---|---|---|
| Example 1 | 1 | A | 118° C. | A | 0.5 | A | 0.97 | A | 14% |
| Example 2 | 2 | B | 126° C. | A | 0.3 | A | 0.99 | A | 10% |
| Example 3 | 3 | A | 115° C. | A | 0.8 | A | 0.97 | A | 18% |
| Example 4 | 4 | A | 119° C. | A | 0.9 | A | 0.98 | A | 12% |
| Example 5 | 5 | A | 118° C. | A | 0.4 | A | 0.99 | B | 20% |
| Example 6 | 6 | B | 120° C. | B | 1.3 | A | 0.95 | A | 18% |
| Example 7 | 7 | A | 109° C. | A | 0.8 | A | 0.96 | A | 18% |
| Example 8 | 8 | C | 130° C. | A | 0.9 | A | 0.96 | C | 26% |
| Example 9 | 9 | A | 110° C. | C | 2.8 | C | 0.88 | A | 18% |
| Example 10 | 10 | A | 116° C. | C | 2.6 | C | 0.87 | B | 23% |
| Example 11 | 11 | C | 134° C. | A | 0.9 | A | 0.96 | B | 24% |
| Example 12 | 12 | C | 135° C. | A | 0.9 | A | 0.95 | C | 25% |
| Example 13 | 13 | A | 110° C. | A | 0.8 | A | 0.96 | A | 19% |
| Example 14 | 14 | A | 110° C. | A | 0.8 | A | 0.95 | B | 21% |
| Example 15 | 15 | A | 110° C. | B | 1.2 | A | 0.96 | B | 21% |
| Example 16 | 16 | A | 110° C. | B | 1.8 | B | 0.92 | C | 25% |
| Example 17 | 17 | B | 120° C. | A | 0.7 | A | 0.96 | B | 22% |
| Example 18 | 18 | A | 111° C. | B | 1.8 | B | 0.94 | B | 22% |
| Example 19 | 19 | A | 110° C. | A | 0.9 | A | 0.96 | C | 26% |
| Example 20 | 20 | B | 128° C. | A | 0.8 | A | 0.95 | A | 17% |
| Example 21 | 21 | B | 129° C. | A | 0.8 | A | 0.96 | A | 18% |
| Example 22 | 22 | A | 110° C. | B | 1.4 | A | 0.95 | B | 20% |
| Example 23 | 23 | A | 110° C. | A | 0.8 | A | 0.95 | A | 18% |
| Example 24 | 24 | A | 110° C. | A | 0.8 | A | 0.96 | B | 24% |
| Example 25 | 25 | B | 128° C. | B | 1.2 | A | 0.96 | C | 27% |
| Example 26 | 26 | B | 128° C. | B | 1.3 | A | 0.95 | C | 28% |
| Example 27 | 27 | A | 109° C. | A | 0.8 | A | 0.95 | A | 19% |
| Example 28 | 28 | C | 131° C. | A | 0.8 | A | 0.95 | A | 19% |
| Example 29 | 29 | A | 110° C. | B | 1.0 | B | 0.92 | A | 16% |
| Example 30 | 30 | A | 112° C. | B | 1.2 | B | 0.93 | A | 19% |
| Example 31 | 31 | A | 116° C. | B | 1.2 | B | 0.94 | A | 15% |
| Example 32 | 32 | A | 110° C. | B | 1.4 | A | 0.96 | A | 16% |
| Example 33 | 33 | A | 114° C. | B | 1.8 | B | 0.92 | A | 18% |
| Example 34 | 34 | A | 115° C. | C | 2.1 | B | 0.93 | A | 16% |
| Example 35 | 35 | B | 122° C. | C | 2.6 | B | 0.90 | A | 19% |
| Example 36 | 36 | A | 115° C. | C | 2.9 | C | 0.87 | A | 19% |
| Example 37 | 37 | B | 120° C. | C | 2.9 | C | 0.84 | A | 16% |
| Example 38 | 38 | B | 125° C. | C | 2.8 | C | 0.83 | A | 16% |
| Example 39 | 39 | B | 120° C. | C | 2.9 | C | 0.80 | A | 18% |
| Comparative Example 1 | 40 | A | 112° C. | D | 3.6 | D | 0.74 | C | 25% |
| Comparative Example 2 | 41 | D | 140° C. | B | 1.1 | B | 0.94 | C | 25% |
| Comparative Example 3 | 42 | A | 113° C. | D | 3.5 | D | 0.78 | A | 18% |
| Comparative Example 4 | 43 | A | 113° C. | D | 3.8 | D | 0.79 | C | 26% |
| Comparative Example 5 | 44 | D | 141° C. | B | 1.4 | A | 0.95 | C | 26% |
| Comparative Example 6 | 45 | D | 145° C. | D | 3.2 | C | 0.85 | D | 30% |
| Comparative Example 7 | 46 | A | 116° C. | B | 1.4 | A | 0.95 | D | 30% |
| Comparative Example 8 | 47 | A | 115° C. | E | 4.5 | E | 0.66 | D | 32% |
| Comparative Example 9 | 48 | B | 121° C. | E | 5.3 | E | 0.59 | A | 19% |
| Comparative Example 10 | 49 | B | 125° C. | E | 5.8 | E | 0.64 | A | 19% |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-113107, filed Jun. 13, 2018, Japanese Patent Application No. 2019-074994, filed Apr. 10, 2019, which are hereby incorporated by reference herein in their entirety.

What is claimed is:

1. A magnetic toner, comprising:
a toner particle, the toner particle including a magnetic body having an oil absorption of 5 to 40 ml/100 g and a hinder resin;
the hinder resin containing a polymer A having first and second monomer units, the first monomer unit being derived from a first polymerizable monomer and the second monomer unit being derived from a second polymerizable monomer different from the first polymerizable monomer;
the first polymerizable monomer being at least one selected from the group consisting of (meth)acrylic acid esters each having a $C_{18-36}$ alkyl group, and a content of the first monomer unit in polymer A being 5.0 to 60.0 mol % of the total moles of all monomer units in the polymer A; and
a content of the second monomer unit in polymer A being 20.0 to 95.0 mol % of the total moles of all monomer units in the polymer A, wherein
$3.00 \leq (SP_{21} - SP_{11}) \leq 25.00$ when $SP_{11}$ $(J/cm^3)^{0.5}$ is an SP value of the first monomer unit and $SP_{21}$ $(J/cm^3)^{0.5}$ is an SP value of the second monomer unit, and
the content of the polymer A in the binder resin is at least 50.0 mass %.

2. A magnetic toner, comprising:
a toner particle, the toner particle including a magnetic body having an oil absorption of 5 to 40 ml/100 g and a binder resin;
the binder resin containing a polymer A that is derived from a composition containing a first polymerizable monomer and a second polymerizable monomer that is different from the first polymerizable monomer;
the first polymerizable monomer being at least one selected from the group consisting of (meth)acrylic acid esters each having a $C_{18-36}$ alkyl group, and a content of the first polymerizable monomer in the composition being 5.0 to 60.0 mol % of the total moles of all polymerizable monomers in the composition; and
a content of the second polymerizable monomer in the composition being 20.0 to 95.0 mol % of the total moles of all polymerizable monomers in the composition, wherein
$0.60 \leq (SP_{22} - SP_{12}) \leq 15.00$ when $SP_{12}(J/cm^3)^{0.5}$ is an SP value of the first polymerizable monomer and $SP_{22}$ $(J/cm^3)^{0.5}$ is an SP value of the second polymerizable monomer, and
the content of the polymer A in the binder resin is at least 50.0 mass %.

3. The magnetic toner according to claim wherein the content of the second monomer unit in the polymer A is 40.0 to 95.0 mol % of the total moles of all monomer units in the polymer A.

4. The magnetic toner according to claim 2, wherein the content of the second polymerizable monomer in the composition is 40.0 to 95.0 mol % of the total moles of all polymerizable monomers in the composition.

5. The toner according to claim 1, wherein the second polymerizable monomer is at least one selected from formulae (A) and (B)

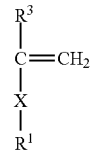
(A)

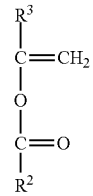
(B)

where X represents a single bond or a $C_{1-6}$ alkylene group, $R^1$ represents a nitrite group (—C≡N), an amido group (—C(=O)NHR^{10}, with $R^{10}$ being a hydrogen atom or a $C_{1-4}$ alkyl group), a hydroxy group, —COOR^{11} (with $R^{11}$ being a $C_{1-6}$ alkyl group or a $C_{1-6}$ hydroxyalkyl group), a urea group (—NH—C(=O)—N(R^{13})_2 in which $R^{13}$s are independently a hydrogen atom or a $C_{1-6}$ alkyl group), —COO(CH_2)_2NHCOOR^{14} (with $R^{14}$ being a $C_{1-4}$ alkyl group) or —COO(CH_2)_2NH—C(=O)—N(R^{15})_2) (in which $R^{15}$s are independently a hydrogen attar or a $C_{1-6}$ alkyl group),
$R^2$ is a $C_{1-4}$ alkyl group, and
$R^3$ is a hydrogen atom or a methyl group.

6. The magnetic toner according to claim 1, wherein the polymer A contains a third monomer unit derived from a third polymerizable monomer that is different from both the first and second polymerizable monomers, the third monomer unit being derived from at least one polymerizable monomer selected from the group consisting of styrene, methyl methacrylate and methyl acrylate.

7. The magnetic toner according to claim 1, wherein the number-average particle diameter of the magnetic body is 50 to 400 nm.

8. The magnetic toner according to claim wherein the BET specific surface area of the magnetic body is 5 to 25 $m^2/g$.

9. The magnetic toner according to claim 1, wherein the oil absorption of the magnetic body is 10 to 35 ml/100 g.

10. The magnetic toner according to claim 1, wherein the volume resistivity obtained by AC impedance measurement of the magnetic toner is at least $1.0 \times 10^{11}$ Ω·cm.

11. The magnetic toner according to claim 1, wherein the content of the magnetic body is 30 to 100 parts by mass per 100 parts by mass of the binder resin.

12. The magnetic toner according to claim 1, wherein the magnetic body comprises a magnetic core particle and a coat layer on the surface of the magnetic core particle, the coat layer containing silicon atoms and aluminum atoms, wherein
$0.10 \leq dSi/dFe \leq 4.00$ and $0.03 \leq dAl/dFe \leq 2.00$ are satisfied in measurement of the surface of the magnetic body by X-ray photoelectron spectroscopy where dSi represents the atomic % of silicon atoms, dAl represents the atomic % of aluminum atoms, and dFe represents the atomic % of iron atoms.

13. The magnetic toner according to claim 1, wherein the magnetic body is octahedral in shape.

14. The magnetic toner according to claim 1, wherein the binder resin further contains a polymer B different from the polymer A, polymer B having art SP value of SP(B) satisfying $$SP_{11} \leq SP(B) \leq SP_{21} \text{ and}$$

$$0(J/cm^3)^{0.5} \leq SP_{21} - SP(B) \leq 4.0(J/cm^3)^{0.5}.$$

15. The magnetic toner according to claim 14, wherein the acid value of the polymer B is 0.1 to 25.0 mg KOH/g.

16. The magnetic toner according to claim 1 wherein the polymer A is a vinyl polymer.

17. A method for manufacturing the magnetic toner according to claim comprising the steps of:
- melt kneading a mixture containing the binder resin and the magnetic body to obtain a kneaded product; and
- pulverizing the kneaded product to obtain a pulverized product.

18. The magnetic toner according to claim 1, wherein the volume resistivity obtained by AC impedance measurement of the magnetic toner is at least $1.0 \times 10^{12}$ Ω·m.

19. The magnetic toner according to claim 1, wherein the binder resin further contains a polymer B different from the polymer A, polymer B having an SP value of SP(B) satisfying $$19.0(J/cm^3)^{0.5} \leq SP(B) \leq 24.0(J/cm^3)^{0.5}.$$

\* \* \* \* \*